United States Patent [19]
Iijima et al.

[11] Patent Number: 5,527,589
[45] Date of Patent: Jun. 18, 1996

[54] ELECTROSTATIC INFORMATION RECORDING MEDIUM

[75] Inventors: Masayuki Iijima; Osamu Shimizu; Yuichi Nakayasu; Yoshiaki Tsuruoka; Kayoko Sugiyama, all of Tokyo, Japan

[73] Assignee: Dai Nippon Printing Co., Ltd., Tokyo, Japan

[21] Appl. No.: 75,581

[22] PCT Filed: Oct. 15, 1992

[86] PCT No.: PCT/JP92/01336

§ 371 Date: Oct. 25, 1993

§ 102(e) Date: Oct. 25, 1993

[30] Foreign Application Priority Data

| | | | |
|---|---|---|---|
| Oct. 16, 1991 | [JP] | Japan | 3-267505 |
| Oct. 17, 1991 | [JP] | Japan | 3-269427 |
| Oct. 17, 1991 | [JP] | Japan | 3-269428 |
| Nov. 12, 1991 | [JP] | Japan | 3-295529 |

[51] Int. Cl.$^6$ .................................................. B32B 3/00
[52] U.S. Cl. ...................... 428/195; 428/411.1; 428/421; 428/422; 428/500; 428/694 BF
[58] Field of Search ........................... 428/195, 206, 428/913, 914, 411.1, 421, 422, 500, 694 BF; 355/200

[56] References Cited

U.S. PATENT DOCUMENTS

| 3,920,330 | 11/1975 | Wells et al. | 355/3 |
|---|---|---|---|
| 4,294,904 | 10/1981 | Mammino | 430/122 |

FOREIGN PATENT DOCUMENTS

| 56-47042 | 4/1981 | Japan . |
|---|---|---|
| 56-113186 | 9/1981 | Japan . |
| 56-138742 | 10/1981 | Japan . |
| 60-128450 | 7/1985 | Japan . |
| 0264647 | 3/1990 | Japan . |

*Primary Examiner*—Patrick J. Ryan
*Assistant Examiner*—W. A. Krynski
*Attorney, Agent, or Firm*—Dellett and Walters

[57] ABSTRACT

The electrostatic information recording medium of the present invention has an electric charge retaining layer 11 stacked on at least an electrode layer 13, as shown in FIG. 1. The electric charge retaining layer is formed from either ① resin selected from among fluorocarbon resins and polystyrene resins, and an insulating organic substance having no photoconductivity. The electrostatic information recording medium may be produced, as shown in FIG. 5, by stacking an insulating resin layer 10 on an electrode layer 13, stacking a photoconductive or electrically conductive fine particle layer 11 on the insulating resin layer 10, and further stacking an insulating resin layer 12 on the fine particle layer 11 to a thickness of 0.1 μm to 1 μm. The electrostatic information recording medium is superior in electric charge retaining characteristics, particularly in the performance of retaining positive information electric charge, and also excellent in heat resistance and moisture resistance. If the insulating resin layers 10 and 12 are formed by coating using a fluorocarbon resin solution, the electrostatic information recording medium can be produced with excellent processability.

3 Claims, 13 Drawing Sheets

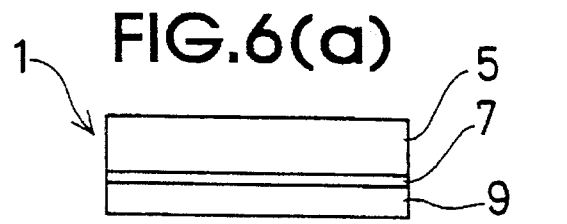
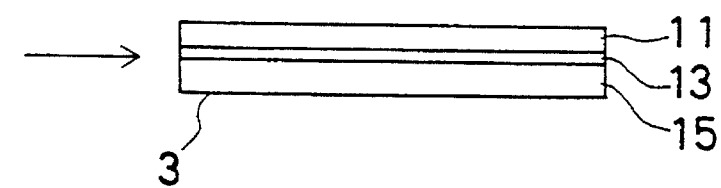
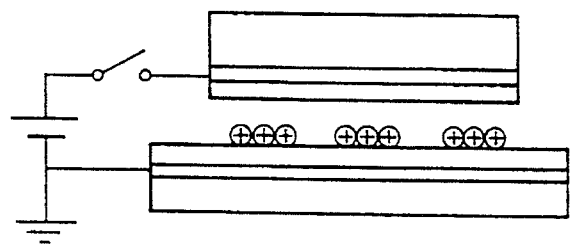
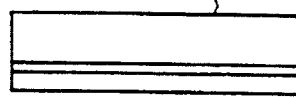
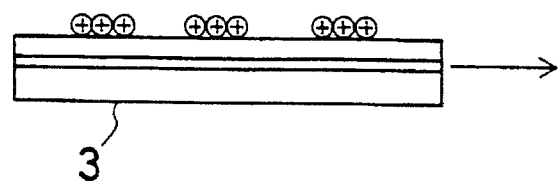

ically by, for example, a method
ELECTROSTATIC INFORMATION RECORDING MEDIUM

TECHNICAL FIELD

The present invention relates to an electrostatic information recording medium which enables information to be recorded thereon electrostatically by, for example, a method wherein exposure is effected under application of a voltage, and which also permits the recorded information to be reproduced at any desired time. More particularly, the present invention relates to an electrostatic information recording medium which has excellent negative electric charge retaining characteristics and which is particularly excellent in positive electric charge retaining characteristics and also superior in heat resistance, moisture resistance and processability.

BACKGROUND ART

There has heretofore been a known electrophotographic technique in which a photoconductive layer deposited on an electrode layer is fully charged and then subjected to image exposure, and the electric charge in the exposed regions is leaked, thereby optically forming an electrostatic latent image on the photoconductive layer, and thereafter toner having electric charge which is opposite in polarity to the residual electric charge is allowed to adhere thereto, thereby developing the image on paper or the like by electrostatic transfer. This technique is mainly employed for copying purposes. The electrostatic charge retaining period in the photoconductive layer as a recording medium is short, and toner development is carried out immediately after the formation of an electrostatic latent image. This technique cannot be used for other purposes, for example, photographing, because of low sensitivity.

In the meantime, an electrostatic information recording method by exposure carried out under voltage application has been developed in which an electrostatic information recording medium is disposed face-to-face with a photosensitive member having a photoconductive layer provided on an electrode, and image exposure is carried out with a voltage being applied between the respective electrodes of the photosensitive member and the recording medium, thereby recording an electrostatic latent image of extremely high resolution on the electrostatic information recording medium. It is extremely important that the electrostatic information recording medium used in this electrostatic information recording method should have excellent electric charge retaining characteristics.

As resins used to form an electric charge retaining layer, fluorocarbon resins are superior in electric charge retaining characteristics but unfavorable in terms of processability required therefor when layered on the electrode. As insulating materials, fluorocarbon resins exhibit high insulation properties with respect to electrons. However, in the case of tetrafluoroethylene-hexafluoropropylene copolymer (FEP), for example, the mobility of electrons is not higher than $10^{-17}$ cm$^2$/V.s, whereas the mobility of holes is as high as $2\times10^{-9}$ cm$^2$/V.s. Thus, the insulation properties with respect to holes cannot be said to be satisfactory.

On the other hand, polystyrene resins are superior in that the glass transition temperature is high and the moisture absorption is low. However, the electric charge retaining characteristics of these resins are so low that none of them can be used as a material for an electric charge retaining layer.

It is an object of the present invention to provide an electrostatic information recording medium having an electric charge retaining layer which is excellent in electric charge retaining characteristics, particularly in positive electric charge retaining performance, and also excellent in heat resistance, moisture resistance and processability.

DISCLOSURE OF THE INVENTION

A first electrostatic information recording medium of the present invention is characterized in that an electric charge retaining layer is stacked on at least an electrode layer, and that the electric charge retaining layer comprises a resin selected from among fluorocarbon resins and polystyrene resins, and an insulating organic substance having no photoconductivity.

The electrostatic information recording medium is further characterized in that a spectrum of thermally stimulated currents, which is obtained by measuring the electric charge retaining layer with an open-circuit thermally stimulated current measuring device after the electric charge retaining layer has been positively charged, has a hetero-peak in addition to a homo-peak.

In general, fluorocarbon resins have a high resistivity and a low water absorption, i.e., 0.01% or less, and exhibit excellent moisture resistance irrespective of whether the retained electric charge is positive or negative and hence enable minimization of the leakage of the retained electric charge in the direction of the film thickness or in the transverse direction at the surface, which is caused by a lowering in the resistivity due to the adsorption of water, the influence of moisture, etc. In addition, since the glass transition temperature is 100° C. or higher, fluorocarbon resins are superior in heat resistance. Therefore, the electric charge retaining performance is satisfactory even at high temperatures, and the stored electric charge only slightly changes with time. Further, since fluorocarbon resins are soluble in a fluorine-containing solvent, they are superior in processability. In particular, since coating is possible, these resins can be used advantageously to provide a uniform film thickness over a predetermined area or to obtain a thin film of several μm. On the other hand, polystyrene resins are superior in that the glass transition temperature is high and the moisture absorption is low.

However, it has been revealed that fluorocarbon resins generally have low positive electric charge retaining characteristics, although they are excellent in negative electric charge (electron) retaining characteristics, and that when a polystyrene resin is used alone, high electric charge retaining characteristics cannot be obtained. The present inventors have found that, if fine particles of an insulating organic substance are dispersed in a fluorocarbon resin or a polystyrene resin, there is an improvement in electric charge retaining characteristics, particularly positive electric charge retaining performance. Although the reason for this is not clear, it is considered that positive electric charge trap sites are produced at the interface between the insulating organic substance fine particles and the fluorocarbon or polystyrene resin, which serves as a matrix, thus making an improvement in the positive electric charge retaining performance. Accordingly, the electrostatic information recording medium of the present invention is improved in the performance of retaining electrostatic information of not only negative electric charge but also positive electric charge. Therefore, it is possible to record information independently of the kind of photosensitive member used for information recording.

A second electrostatic information recording medium of the present invention is characterized in that an electric charge retaining layer is stacked on at least an electrode layer, and that the electric charge retaining layer comprises a fluorine-containing thermoplastic resin that consists of a repeating unit represented by formula (1):

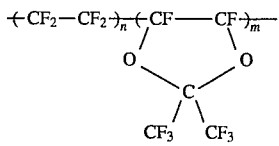

(where the content of the dioxonol component represented by the number m of repeating units is in the range of 20 mol % to 90 mol %) the fluorine-containing thermoplastic resin having a melt viscosity of $10^2$ to $10^4$ Pa.sec at a temperature which is 90° C. to 110° C. higher than its glass transition temperature.

We have found that the fluorine-containing thermoplastic resin of the above formula (1) has a high resistivity, i.e., $1 \times 10^{14}$ ohm-cm or higher, e.g., $10^{18}$ ohm-cm, excellent electric charge retaining performance and a low water absorption, i.e., 0.01% or lower, and hence enables minimization of the leakage of the retained electric charge in the direction of the film thickness or in the transverse direction at the surface, which is caused by a lowering in the resistivity due to adsorption of water, and that since the glass transition temperature is 100° C. or higher, the heat resistance is superior, and hence the electric charge retaining performance is satisfactory even at high temperatures, and the stored electric charge only slightly changes with time. Thus, information electric charge can be stored for a long period of time. Further, since the resin of the above formula (1) is soluble in a fluorine-containing solvent, it is superior in processability. In particular, since coating is possible, the resin can be used advantageously to provide a uniform film thickness over a predetermined area or to obtain a thin film of several μm.

A third electrostatic information recording medium of the present invention is characterized in that an electric charge retaining layer is stacked on at least an electrode layer, and that the electric charge retaining layer comprises an insulating resin layer stacked on the electrode layer, a photoconductive or electrically conductive fine particle layer stacked on the insulating resin layer, and an insulating resin layer stacked on the fine particle layer to a thickness of 0.1 μm to 1 μm, and further that the insulating resin is a fluorocarbon resin.

A method of producing the third electrostatic information recording medium according to the present invention is characterized in that after an insulating resin layer has been formed on an electrode by coating, either a photoconductive fine particle layer or an electrically conductive fine particle layer is formed on the insulating resin layer by vapor deposition under a low vacuum in a state where the insulating resin layer does not soften, and another insulating resin layer is formed on the fine particle layer to a thickness of 0.1 μm to 1 μm by coating, thereby producing an electrostatic information recording medium, and that the insulating resin is a fluorocarbon resin.

In the third electrostatic information recording medium of the present invention, an insulating resin layer having a thickness of 0.1 μm to 1 μm has previously been stacked on either a photoconductive fine particle layer or an electrically conductive fine particle layer. Therefore, it is surmised that the electrostatic charge that is formed on the surface of the insulating resin layer during electrostatic recording is caused to pass through the insulating resin layer by the action of an electric field formed by the electrostatic charge and then retained in the photoconductive or electrically conductive fine particles. Thus, the electrostatic charge can be stably retained without the need to form a protective film.

If the insulating resin layer is formed from a fluorocarbon resin, the resin layer has a high resistivity and a low water absorption, i.e., 0.01% or lower, and hence enables minimization of the leakage of the retained electric charge in the direction of the film thickness or in the transverse direction at the surface, which is caused by a lowering in the resistivity due to adsorption of water. In addition, since the glass transition temperature is 100° C. or higher, the heat resistance is superior, and hence the electric charge retaining performance is satisfactory even at high temperatures, and the stored electric charge only slightly changes with time. If the layer is formed by coating using a solution prepared by dissolving a fluorocarbon resin in a fluorine-containing solvent, superior processability is obtained, i.e., it is possible to provide a uniform film thickness over a predetermined area or to obtain a thin film of several μm.

A fourth electrostatic information recording medium of the present invention is characterized in that an electric charge retaining layer is stacked on at least an electrode layer, and that the electric charge retaining layer comprises an insulating resin layer formed from an insulating organic substance having no photoconductivity and an insulating resin, which is stacked on the electrode layer, a photoconductive or electrically conductive fine particle layer stacked on the insulating resin layer, and another insulating resin layer stacked on the fine particle layer to a thickness of 0.1 μm to 1 μm, and further that the insulating resin is a fluorocarbon resin.

A method of producing the fourth electrostatic information recording medium according to the present invention is characterized in that after an insulating resin layer having an insulating organic substance with no photoconductivity dispersed therein has been formed on an electrode by coating, either a photoconductive fine particle layer or an electrically conductive fine particle layer is formed on the insulating resin layer by vapor deposition under a low vacuum in a state where the insulating resin layer does not soften, and a fluorocarbon resin layer is formed on the fine particle layer to a thickness of 0.1 μm to 1 μm by coating, thereby producing an electrostatic information recording medium.

In the fourth electrostatic information recording medium of the present invention, the insulating resin layer in the third electrostatic information recording medium is allowed to contain an insulating organic substance having no photoconductivity, thereby making it possible to improve the negative electric charge retaining performance and, particularly, the positive electric charge retaining performance. Thus, it is possible to record information independently of the kind of photosensitive member used for information recording.

In addition, in the first to fourth electrostatic information recording mediums of the present invention, the information electric charge stored therein is extremely stable. Accordingly, these mediums can be used, for example, as a recording drum for an ion flow printer. In such a case, it is possible to construct a so-called multi-printer in which after print information has been recorded by the ion flow printer, a desired number of hard copies can be obtained. Further, the potential difference can be readily detected by measuring the potential difference between the electrode and the surface potential. In addition, it is possible to output an electric signal corresponding to the electrostatic latent image and to display it on a CRT or to print it out by a sublimation transfer printer or the like. Further, since the information storage means is arranged in units of electrostatic charge, the electrostatic information recording medium can store information of high quality and high resolution.

BRIEF DESCRIPTION OF THE DRAWINGS

FIGS. 6(a), 6(b), 6(c) and 6(d) illustrate a method of recording electrostatic information on the first to fourth electrostatic information recording mediums according to the present invention.

BEST MODE FOR CARRYING OUT THE INVENTION

First of all, the first electrostatic information recording medium will be described.

Figure 1A:
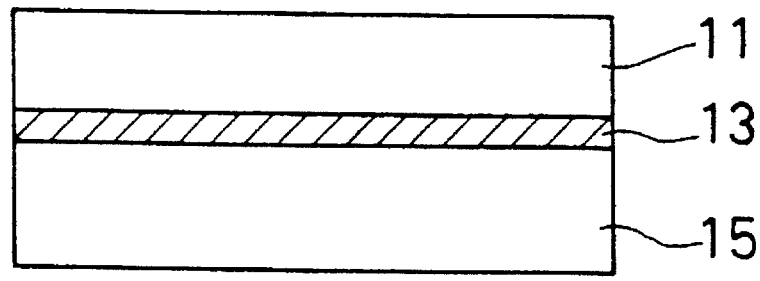
FIGS. 1(a) and 1(b) are sectional views showing embodiments of the first or second electrostatic information recording medium according to the present invention.
Figure 1B:
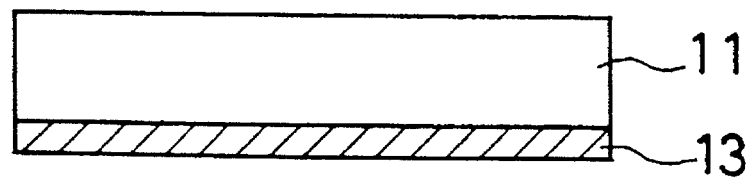

FIGS. 1(a) and 1(b) are sectional views showing embodiments of the first electrostatic information recording medium. In the figure, reference numeral 3 denotes an electrostatic information recording medium, 11 an electric charge retaining layer, 13 an electrode, and 15 a substrate.

As a fluorocarbon resin, a fluorocarbon resin of high insulation quality, which has a resistivity of $10^{14}$ ohm-cm or higher, is used. Examples of usable resins include fluorocarbon resins such as poly(tetrafluoroethylene) (PTFE), tetrafluoroethylene-perfluoroalkyl vinyl ether copolymer (PFA), tetrafluoroethylene-hexafluoropropylene copolymer (FEP), tetrafluoroethylene-hexafluoropropylene-perfluoroalkyl vinyl ether copolymer (EPE), tetrafluoroethylene-ethylene copolymer (ETFE), poly(chlorotrifluoroethylene) (PCTFE), chlorotrifluoroethylene-ethylene copolymer (ECTFE), pentafluorostyrene polymer, etc. It is also possible to use thermoplastic resins, thermosetting resins, energy radiation curing resins such as ultraviolet curing resins, electron radiation curing resins, engineering plastics, etc., in which a part or all the hydrogen atoms have been replaced by fluorine atoms.

Further, it is possible to use a fluorine-containing thermoplastic resin consisting of a repeating unit of a ring structure represented by the formula:

$$+CF_2-CF\diagdown_{O-(CF_2)_n}^{CF_2}CF+$$

and/or the formula:

$$+CF_2-CF-CF-CF_2+\atop{|\quad\quad|\atop O-(CF_2)_n}$$

(where n is 1 or 2)
the fluorine-containing thermoplastic resin having such a molecular weight that the intrinsic viscosity at 50° C. is at least 0.1, and a fluorine-containing thermoplastic resin consisting of a repeating unit (a) of a ring structure represented by the formula:

$$+CF_2-CF\diagdown_{O-(CF_2)_n}^{CF_2}CF+$$

and/or the formula:

$$+CF_2-CF-CF-CF_2+\atop{|\quad\quad|\atop O-(CF_2)_n}$$

(where n is 1 or 2)
and a repeating unit (b) represented by the formula:

$$-(CF_2-CFX)-$$

(where X is F, Cl, $-O-CF_2CF_2CF_3$, $-O-CF_2CF(CF_3)OCF_2CF_2SO_3F$, or $-O-CF_2CF_2CF_2COOCH_3$)
the fluorine-containing thermoplastic resin containing at least 80% by weight of repeating unit (a) and having an intrinsic viscosity of at least 0.1 at 50° C.

The repeating unit (a) is obtained by radical cyclopolymerization of a perfluoroaryl vinyl ether or perfluorobutenyl vinyl ether represented by the formula:

$$CF_2=CF-O-(CF_2)_nCF=CF_2$$

(where n is 1 or 2)
A fluorine-containing thermoplastic resin that contains both the repeating units (a) and (b) is obtained by radical polymerization of a perfluorovinyl ether represented by the formula:

$$CF_2=CF-O-(CF_2)_nCF=CF_2$$

(where n is 1 or 2)
and a monomer represented by the formula:

$$CF_2=CFX$$

(where X is F, Cl, $-O-CF_2CF_2CF_3$, $-O-CF_2CF(CF_3)OCF_2CF_2SO_3F$, or $-O-CF_2CF_2CF_2COOCH_3$)
These resins are disclosed, for example, in Japanese Patent Application Laid-Open (KOKAI) No. 1-131215.

Further, it is possible to use a fluorine-containing thermoplastic resin that consists of a repeating unit represented by $$+CF_2-CF_2\mathord{\mathrel{\mathop:}}_n+CF-CF+_m\atop{O\diagdown\quad\diagup O\atop C\atop\diagup\quad\diagdown\atop CF_3\quad CF_3}$$

(where the content of the dioxonol component represented by the number m of repeating units is in the range of 20 mol % to 90 mol %)
the fluorine-containing thermoplastic resin having a melt viscosity of $10^2$ to $10^4$ Pa.sec at a temperature which is 90° C. to 110° C. higher than its glass transition temperature.

Specific examples of fluorine-containing thermoplastic resins represented by the above formula (1) are "Teflon" AF1600 (trade name), manufactured by Du Pont Co., Ltd., containing about 65 mol % dioxonol unit and having a glass transition temperature of 160° C., a melt viscosity of 2657 Pa.sec (measured by ASTM D3835 at 250° C. and 100 $sec^{-1}$) and a water absorption of 0.01% or less, and "Teflon" AF2400 (trade name), manufactured by Du Pont Co., Ltd., containing about 85 mol % dioxonol unit and having a glass transition temperature of 240° C., a melt viscosity of 540 Pa.sec (measured by ASTM D3835 at 350° C. and 100 $sec^{-1}$) and a water absorption of 0.01% or less.

Next, an organic substance that is to be dispersed in the fluorocarbon resin must exhibit no photoconductivity and have insulation quality of $10^6$ ohm-cm or higher in terms of resistivity and further needs to be insoluble in a fluorine-containing solvent, which is used as a solvent for the above-described fluorocarbon resin, but dispersible in the fluorocarbon resin. Further, it is preferable for the organic substance to have a boiling temperature higher than the heat-treating temperature in a drying process carried out during the production of an electrostatic information recording medium so that the organic substance will not evaporate during the drying process.

There is no specific restriction on such an organic substance, provided that the above-described requirements are satisfied. Examples of such an organic substance include benzenes and naphthalenes having at least one group selected from among amino, nitro and halogen groups as a substituent, cyclohexanes having a halogen group as a substituent, polymers such as polymethacrylic acid, and photosensitizers such as 2,4,7-trinitrofluorenone, 7,7,8,8-tetracyanoquinodimethane, phenothiazine, perylene, phthalic anhydride, maleic anhydride, fluorenyl, triphenylamine, etc. The organic substance is preferably contained in the fluorocarbon resin in an amount of $10^{-4}$ wt % to 1 wt %. If the amount of organic substance dispersed in the fluorocarbon resin is less than $10^{-4}$ wt %, the addition of the organic substance produces no effect. If the amount of organic substance exceeds 1 wt %, it becomes difficult to disperse the substance, and the effectiveness obtained by the addition of the organic substance lessens.

It is preferable that the above-described organic substances be dispersed by using glass beads or the like in a solution prepared by dissolving a fluorocarbon resin in a fluorine-containing solvent, e.g., Florinato FC-40, FC-75, etc. (trade name; manufactured by 3M (K.K.)).

The dispersion may be coated on the electrode layer by a method, for example, spinner coating, spraying, brushing, dipping, etc. After the coating process, the fluorine-containing solvent is removed by evaporation at a temperature higher than the boiling point of the solvent, and then the coating is dried. In this way, it is possible to obtain an electric charge retaining layer having a thickness of 0.1 μm to 100 μm, preferably 0.1 μm to 10 μm. If the thickness is less than 0.1 μm, the electric charge retained in the layer may leak, whereas, if the thickness exceeds 100 μm, the electrostatic information recording medium will lose the required flexibility.

It should be noted that the dispersion may be formed into a film and bonded to the electrode through an adhesive or the like. It is also possible to stack an electrode forming material on one side of a fluorocarbon resin film by vapor deposition or other similar method. However, it is preferable to produce the electric charge retaining layer by coating from the viewpoint of processability.

Next, as a polystyrene resin, one which has insulation quality of about $10^{16}$ ohm-cm in terms of resistivity and a molecular weight of $10^3$ to $10^6$ is generally used. If the molecular weight is less than $10^3$ or exceeds $10^6$, the coatability and the film stability are unfavorable. Examples of such polystyrene resins include Piccolastic D125, A75, D75, D125, D137, D150, etc. (trade name; manufactured by Rika Hercules Co.). Examples of solvents usable for these polystyrene resins are xylene, toluene, monochlorobenzene, methyl ethyl ketone, chloroform, benzene, tetrahydrofuran, etc.

Any of the organic substances which may be added to the above-described fluorocarbon resin can similarly be used as an organic substance to be added to the polystyrene resin. The method of stacking the polystyrene resin layer on the electrode and the layer thickness are the same as those in a case where the above-described fluorocarbon resin is used.

When thermally stimulated currents in the electric charge retaining layer are measured, a spectrum representing the relationship between the heating temperature and the thermally stimulated current is obtained. In the case of the first electrostatic information recording medium of the present invention, the spectrum has not only an ordinary homo-peak but also a hetero-peak which does not appear when an electric charge retaining layer is formed from a fluorocarbon resin alone, although the reason for this is not clear.

Figure 2:
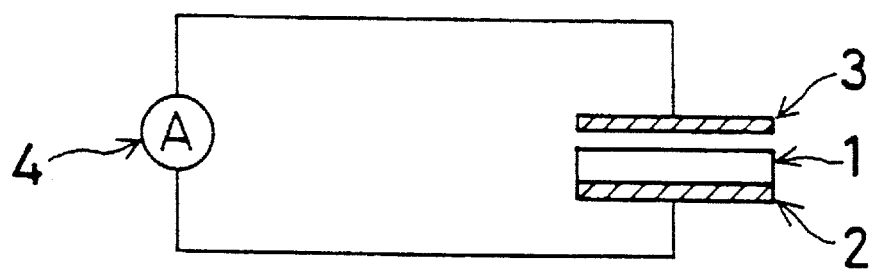
FIG. 2 is a schematic view showing an open-circuit thermally stimulated current measuring device used in the present invention.

FIG. 2 is a schematic view showing an open-circuit TSC (Thermally Stimulated Current measuring device (manufactured by (K.K.) Toyo Seiki Seisakusho) used to measure thermally stimulated currents. The open-circuit TSC measuring device is arranged as follows: An electrically charged sample 1 that is provided on an electrode 2 is disposed to face an upper electrode 3 at a predetermined distance. The two electrodes are connected together with an ammeter 4 interposed therebetween. With this arrangement, currents are measured while the sample is being heated at a predetermined rate of temperature rise.

The measurement is effected in such a way that changes in the potential of the upper electrode induced by the surface potential of the electrically charged sample are taken out in the form of current changes in an external circuit. Normally, the sign of the current taken out is opposite to the sign of the surface potential of the sample. That is, if the surface potential is positive, the thermally stimulated current is negative, whereas, if the surface potential is negative, the thermally stimulated current is positive. The current having the normal sign is referred to as "homo-current", while the current having the sign opposite to the normal is referred to as "hetero-current". In the electrostatic information recording medium of the present invention, when a thermally stimulated current spectrum, which represents the relationship between the heating temperature and the induced current, is measured with the heating temperature changed, the spectrum has a hetero-peak in addition to an ordinary homo-peak. It should be noted that, when the electric charge retaining layer is negatively charged, no hetero-peak appears.

Figure 3:
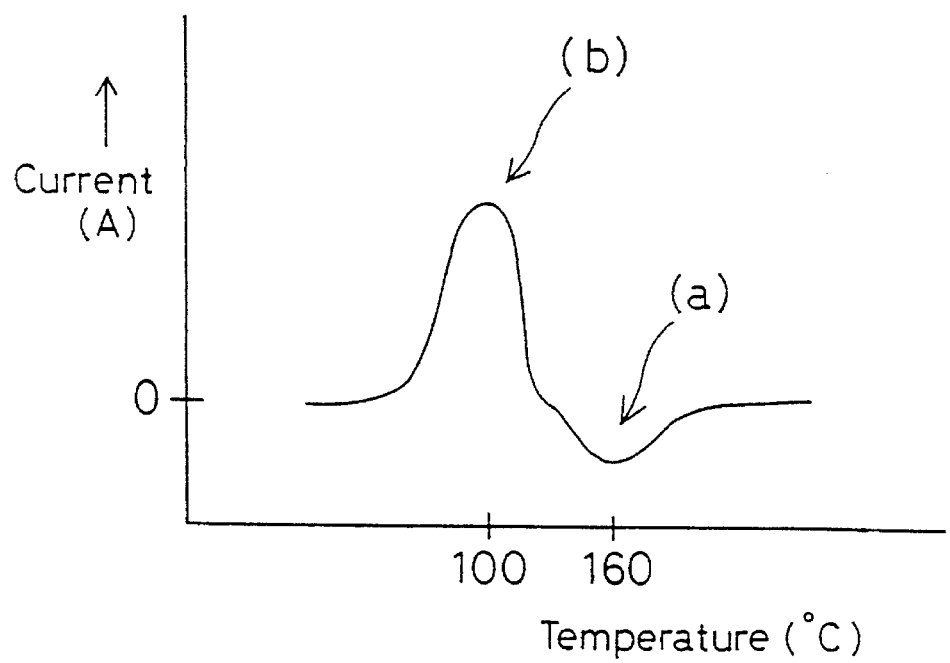
FIG. 3 is a graph of a thermally stimulated current spectrum that is generally shown by the electrostatic information recording medium of the present invention.
Figure 4:
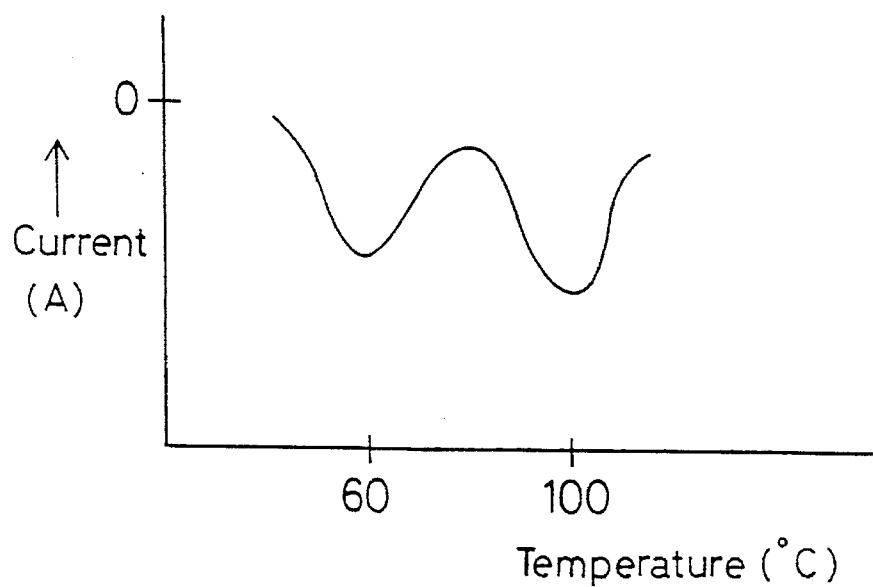
FIG. 4 is a graph of a thermally stimulated current spectrum shown by an electrostatic information recording medium wherein an insulating organic substance having no photoconductivity is not dispersed in its electric charge retaining layer.

FIG. 3 shows schematically a thermally stimulated current spectrum which is generally shown by the electrostatic information recording medium of the present invention. FIG. 4 shows schematically a thermally stimulated current spectrum measured in a case where an insulating organic substance having no photoconductivity is not dispersed in the electric charge retaining layer. As shown in FIG. 3, the electrostatic information recording medium of the present invention shows a hetero-peak (b) in addition to an ordinary homo-peak (a). However, in FIG. 4, only negative currents flow, and no hetero-current flows.

Next, the second electrostatic information recording medium of the present invention will be described.

In the second electrostatic information recording medium, the electric charge retaining layer in the above-described first electrostatic information recording medium is replaced by an electric charge retaining layer which is formed on the electrode by using singly a fluorine-containing thermoplastic resin of the above formula (1) and by employing the same stacking method as in the case of the first electrostatic information recording medium.

The electric charge retaining layer of the electrostatic information recording medium may contain photoconductive or electrically conductive fine particles in order to enhance the electric charge storing function.

Examples of usable photoconductive fine particle materials are inorganic photoconductive materials such as amorphous silicon, crystalline silicon, amorphous selenium, crystalline selenium, cadmium sulfide, zinc oxide, etc., and organic photoconductive materials such as polyvinylcarbazole, phthalocyanine, azo pigment, etc.

Examples of usable electrically conductive materials are elements of the following groups in the periodic table: the group 1A (alkali metals), the group 1B (copper group), the group 2A (alkaline earth metals), the group 2B (zinc group), the group 3A (aluminum group), the group 3B (rare earth elements), the group 4B (titanium group), the group 5B (vanadium group), the group 6B (chromium group), the group 7B (manganese group), the group 8 (iron group and platinum group), group 4A (carbon group) elements, i.e., carbon, silicon, germanium, tin and lead, group 5A (nitrogen group) elements, i.e., antimony and bismuth, and group 6A (oxygen group) elements, i.e., sulfur, selenium and tellurium. These materials are used in the form of fine powder. Among the above-described elements, the metals may also be used in the form of metal ions or fine particles of alloys, organic metal compounds or complexes. Further, the above-described elements may be used in the form of oxides, phosphides, sulfides or halides. Carbon, gold, copper, and aluminum are preferably used.

To allow the fine particles to be present in the electric charge retaining layer, first, the resin of formula (1) is dissolved in a fluorocarbon resin system solvent mentioned in the description of the first electrostatic information recording medium, and a resin layer is formed under the same coating conditions, thereby forming an electric charge retaining layer. Thereafter, the resin layer is heated to the region of the softening point thereof, and the above-described fine particle forming material is deposited by using a low-pressure deposition apparatus at a low pressure of about 10 Torr to $10^{-3}$ Torr. Consequently, the fine particle forming material condenses in the form of ultrafine particles having a diameter of about 10 µm to 0.1 µm. In this way, the fine particles can be made present in the vicinity of the surface of the resin layer.

The fine particle material may be dispersed in an amount in the range of from $10^{-4}$ wt % to 1 wt % in a resin solution prepared by using a fluorine-containing solvent mentioned in the description of the first electrostatic information recording medium, and formed on the electrode by using a coating method and stacking conditions (film thickness, etc.) as mentioned in the description of the first electrostatic information recording medium.

Next, the third and fourth electrostatic information recording mediums of the present invention will be described.

Figure 5A:
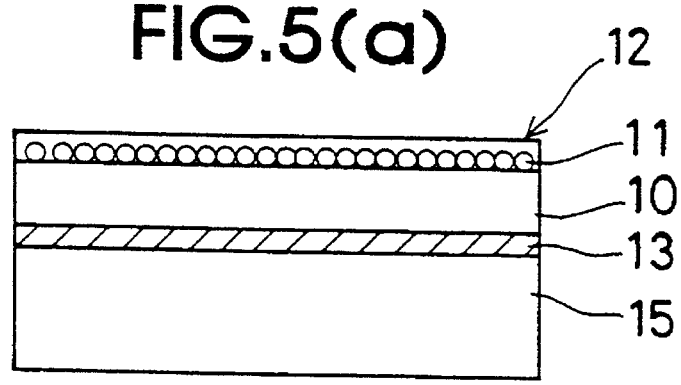
FIGS. 5(a) and 5(b) are sectional views showing embodiments of the third or fourth electrostatic information recording medium according to the present invention.
Figure 5B:
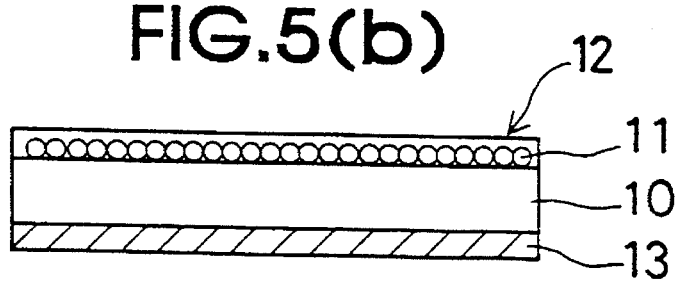

FIGS. 5(a) and 5(b) are sectional views showing embodiments of the third and fourth electrostatic information recording mediums according to the present invention. In the figure, reference numeral 3 denotes an electrostatic information recording medium, 10 an insulating resin layer, 11 a photoconductive or electrically conductive fine particle layer, 12 an insulating resin layer having a thickness of 0.1 µm to 1 µm, 13 an electrode, and 15 a substrate.

A resin that is used to form the insulating resin layers 10 and 12 is required to have insulation quality of at least $10^{14}$ ohm-cm in terms of resistivity in order to suppress the migration of information electric charge. A resin that is used to form an electric charge retaining layer needs to have a glass transition temperature higher than the service temperature from the viewpoint of electric charge retaining performance. Examples of usable resins include thermoplastic resins, thermosetting resins, energy radiation curing resins such as ultraviolet curing resins and electron radiation curing resins, and engineering plastics. The fluorocarbon resins mentioned for the first electrostatic information recording medium are particularly preferably used.

For the fourth electrostatic information recording medium also, any of the organic substances having no photoconductivity mentioned for the first electrostatic information recording medium is usable in the same way.

First, to form the insulating resin layer 10, it is preferable to use the resin solution and coat it by the same method as in the case of the electric charge retaining layer in the first electrostatic information recording medium. Further, a photoconductive fine particle layer or electrically conductive fine particle layer 11 is provided on the insulating resin layer 10. For the photoconductive or electrically conductive fine particle layer 11, the photoconductive or electrically conductive fine particle materials mentioned in the description of the second electrostatic information recording medium can be used.

The fine particle layer 11 is stacked on the insulating resin layer by vapor deposition using a low-pressure deposition apparatus at a temperature lower than the melting temperature of the resin of the insulating resin layer. When evaporated at a low pressure of about 10 Torr to $10^{-3}$ Torr, the deposition material condenses in the form of ultrafine particles having a diameter of about 0.1 µm to 10 µm, which are stacked in the form of a single layer or a plurality of aligned layers on the insulating resin layer. Then, the insulating resin layer 12 is coated on the fine particle layer to a thickness of 0.1 µm to 1 µm by the same method as in the formation of the insulating resin layer 10.

The information recording mechanism in the third and fourth electrostatic information recording mediums is considered to be as follows. When electric charge is formed on the surface of the electrostatic information recording medium by electrostatic recording, the surface electric charge is caused to pass through the insulating resin layer 12 by the action of an electric field formed by the surface electric charge and the electric charge of the opposite polarity induced in the electrode by the surface electric charge, and stably retained in the photoconductive or electrically conductive fine particles. If the thickness of the layer 12 exceeds 1 µm, the surface electric charge cannot pass therethrough but merely remains in the form of surface electric charge. Accordingly, no electric charge is injected into the fine particles. Therefore, a layer thickness exceeding 1 µm is not preferable. The insulating resin layer 12 makes it unnecessary to form a protective layer after recording. Thus, it is possible to realize an electrostatic information recording medium improved in electric charge retaining performance.

In production of the electrostatic information recording medium, a fine particle layer is deposited on the insulating resin layer 10 held at a temperature lower than the softening point thereof. Therefore, it is possible to use resins having a relatively high softening point in addition to the resins mentioned for the second electrostatic information recording medium. Accordingly, it is possible to widen the range of selection of resins used as a material for forming the resin layer. It should be noted that, if a fluorocarbon resin is used as an insulating resin, even more excellent electric charge retaining performance is achieved by virtue of the high insulation quality and low water absorption of the fluorocarbon resin.

As has been described above, the first to fourth electrostatic information recording mediums of the present invention are designed to record information in the electric charge retaining layer or the fine particle layer in the form of a distribution of electrostatic charges. Accordingly, the electrostatic information recording medium may be formed in various shapes in accordance with the kind of information to be recorded or the recording method employed. For example, when the electrostatic information recording medium is used for a camera, it is formed in the shape of ordinary film (for a single frame or for a series of frames), a disk or a card. When digital or analog information is to be recorded thereon by laser or the like, the electrostatic information recording medium is formed in the shape of a tape, a disk or a card.

The substrate 15 in FIGS. 1 and 5 is employed to support the electrostatic information recording medium. Accordingly, there are no specific restrictions on the thickness and material of the substrate, provided that it is sufficiently strong to support the electric charge retaining layer. Examples of usable materials are a flexible plastic film, metal foil, paper, or a rigid material such as glass, plastic sheet, metal sheet (capable of serving also as an electrode), etc. There are cases where the substrate 15 needs to be capable of transmitting light. In such cases, if necessary, anti-reflection properties can be given by providing a layer having anti-reflection effect, or adjusting the film thickness to a level at which anti-reflection effect is obtainable, or combining these two. When the electrostatic information recording medium is formed in the shape of a flexible film, tape, disk or card, a flexible plastic film is used as the substrate. When the electrostatic information recording medium is required to have a certain level of strength, a rigid sheet or inorganic material, for example, glass, is used as the substrate.

The electrode 13 in FIGS. 1 and 5 may be formed on the substrate 15. There is no restriction on the material of the electrode 13, provided that the specific resistance of the material is not higher than $10^6$ ohm-cm. Examples of such material are an inorganic metallic conductive film, e.g., zinc, titanium, copper, iron, tin, etc., an inorganic metallic oxide conductive film, e.g., tin oxide, indium oxide, zinc oxide, titanium oxide, tungsten oxide, vanadium oxide, etc., and an organic conductive film, e.g., quaternary ammonium salt, and so forth. These materials may be used alone or in the form of a composite material comprising two or more of them. Among these materials, oxide semiconductors are preferable; indium-tin oxide is particularly preferable. Such an electrode is formed on the substrate by vapor deposition, sputtering, CVD, coating, plating, dipping, electrolytic polymerization or the like. The layer thickness of the electrode needs to be changed depending upon the electrical characteristics of the material thereof and the level of voltage applied to record information. For example, the thickness is about from 100 Å to 3,000 Å. The electrode 13 may be formed either on the whole area between the substrate and the electric charge retaining layer or in conformity with the pattern of the electric charge retaining layer formed.

The electrostatic information recording mediums shown in FIGS. 1(b) and 5(b) have no substrate 15. These electrostatic information recording mediums are produced in such a manner that after an electric charge retaining layer has been formed in the shape of a film, an electrode layer is formed on a surface of the electric charge retaining layer by vapor deposition, laminating, etc. In the third or fourth electrostatic information recording medium, the electrode layer is provided on the surface of the electric charge retaining layer which is reverse to the side where the fine particle layer is stacked.

The surface of the first or second electrostatic information recording medium of the present invention is preferably formed with a protective film after recording of information to protect the surface against damage and to prevent decay of the stored information electric charge. As a protective film, a plastic film may be used. Alternatively, a protective film may be formed by coating of a plastic solution or by vapor deposition or the like to a thickness of from several hundreds Å to several tens μm. In this order of thickness, the stored information can be reproduced without hindrance.

When the electrostatic information recording medium needs to be endowed with photosensitivity at the same time, the electric charge retaining layer in the first or second electrostatic information recording medium of the present invention should be stacked by coating or bonding on the surface of a photoconductive layer of a photosensitive member having the photoconductive layer on an electrode. In the case of the electric charge retaining layer in the third or fourth electrostatic information recording medium, it should be stacked at the side thereof where the fine particle layer is provided.

The following is a description of a method of recording electrostatic information on the first to fourth electrostatic information recording mediums and a method of reproducing the recorded information therefrom. FIGS. 6(a), 6(b), 6(c) and 6(d) are views for explanation of the electrostatic information recording method. In the figure, reference numeral 1 denotes a photosensitive member, 3 an electrostatic information recording medium, 5 a substrate, 7 an electrode, 9 a photoconductive layer, 17 a power supply, and 19 information light.

First, a transparent electrode 7 of ITO having a thickness of 1,000 Å is formed on a substrate 5 of glass having a thickness of 1 mm, and a photoconductive layer 9 having a thickness of about 10 μm is formed thereon to form a photosensitive member 1. As shown in FIG. 6(a), the electrostatic information recording medium 3 is disposed face-to-face with the photosensitive member 1 across an air gap of about 10 μm.

Next, a voltage is applied between the electrodes 7 and 13 from the power supply 17, as shown in FIG. 6(b). Although in the figure the voltage is applied in such a manner that the photosensitive member side is positive, while the electrostatic information recording medium is negative, when negative electric charge information is to be recorded on the electrostatic information recording medium, the photosensitive member side must be negative.

If the photosensitive member 1 and the electrostatic information recording medium 3 are placed in the dark, since the photoconductive layer 9 is a highly resistive element, no change occurs between the electrodes as long as the voltage applied across the air gap is lower than the discharge initiating voltage according to Paschen's law. When a voltage that exceeds the discharge initiating voltage is applied across the air gap from an external power supply, an electric discharge is induced, so that electric charge is stored on the electrostatic information recording medium. This state continues until the applied voltage lowers down to the discharge initiating voltage, thus forming background electric charge. When light 18 is applied from the photosensitive member (1) side, regions of the photoconductive layer 9 where the light is incident become electrically conductive, inducing an electric discharge, and thus allowing electric charge to be stored on the electrostatic information recording medium. In a case where uniform background electric charge has been provided in advance, electric charge is further stored in the regions where the light is incident. Then, the power supply 17 is turned off, and the electrostatic information recording medium 3 is separated from the photosensitive member 1, thus completing the formation of an electrostatic latent image. When planar analog recording is effected by this electrostatic information recording method, a high resolution is obtained in the same way as in the silver halide photography, and the recorded information can be stored for a long period of time without decay of the electric charge.

As a method of inputting information to the electrostatic information recording medium of the present invention, a method using a high-resolution electrostatic camera or a recording method using laser may be employed. The high-resolution electrostatic camera that is used in the present invention employs the electrostatic information recording medium of the present invention in place of a photographic film used in ordinary cameras. The electrostatic information recording medium is placed in close contact or face-to-face with a photosensitive member, and with a voltage being applied to the two electrodes, an electrostatic latent image is formed in accordance with the incident optical image. Either an optical or electric shutter can be used for this camera. It is also possible to conduct color photography by using a color filter by which light information is separated into R, G and B light components and taken out in the form of parallel rays through prisms, and forming one frame from the electrostatic information recording medium separated into R, G and B light components or from one set of R, G and B images arranged on one plane.

In the recording method by laser, argon laser (514 nm, 488 nm), helium-neon laser (633 nm) or semiconductor laser (780 nm, 810 nm, etc.) may be used as a light source. The photosensitive member and the electrostatic information recording medium are brought into close contact with each other at their surfaces or they are placed so as to face each other at a predetermined distance, and a voltage is applied thereto. In this case, it is preferable to set the photosensitive member electrode so as to have the same polarity as that of carriers in the photosensitive member. Under such conditions, laser exposure corresponding to a picture image signal, character signal, code signal or line drawing signal is performed by scanning. Analog recording such as that of a picture image is effected by modulating the intensity of laser light, whereas digital recording such as that of characters, code or line drawing is effected by on/off control of laser light. A picture image consisting of halftone dots is formed by on/off controlling laser light through a dot generator. It should be noted that the photoconductive layer in the photosensitive member need not have panchromatic spectral characteristics, but it is only required to have sensitivity to the wavelength of the laser light source employed.

Recording of information on the electrostatic information recording medium of the present invention can also be effected by an electrostatic recording method that employs an electrode stylus head or an ion flow head, or a recording method that employs an optical printer, e.g., a laser printer, or a recording method that employs an electron beam, ion implantation, etc. instead of using the above-described photosensitive member.

Figure 7:
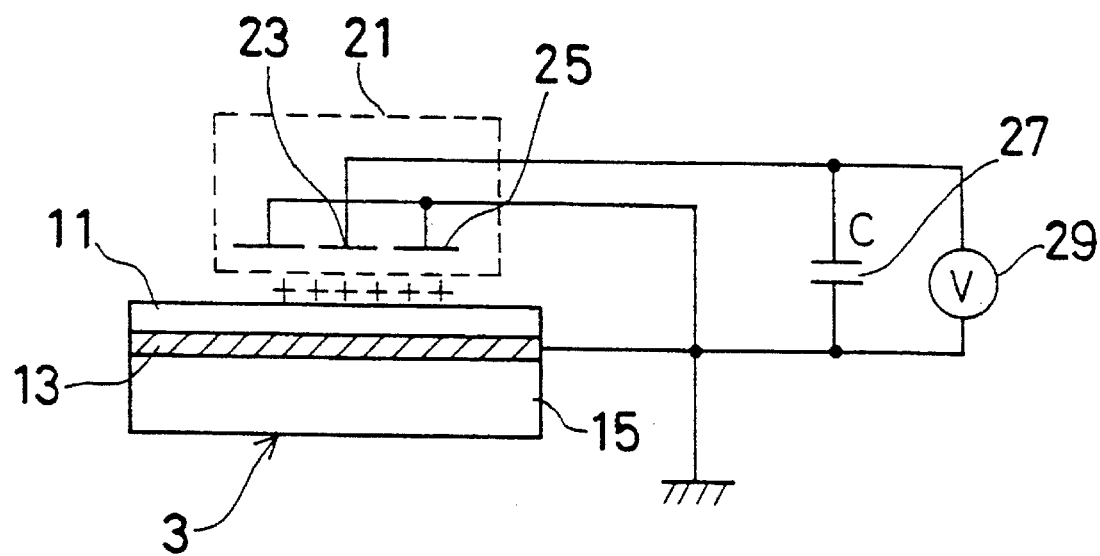
FIG. 7 illustrates one example of DC amplification type potential reading method used to read the electrostatic information recorded on the first to fourth electrostatic information recording mediums according to the present invention.

The method of reproducing the electrostatic information recorded on the electrostatic information recording medium will next be explained. FIG. 7 shows an example of an electric potential reading method in the electrostatic information recording and reproducing method, in which the same reference numerals as those shown in FIGS. 1(a) and 1(b) denote the same contents. In this figure, reference numeral 21 denotes an electric potential reading unit, 23 a detection electrode, 25 a guard electrode, 27 a capacitor, and 29 a voltmeter.

To reproduce the information electric charge stored on the electrostatic information recording medium, first, the electric potential reading unit 21 is placed face-to-face with the surface of the electrostatic information recording medium. Consequently, an electric field that is generated by the electric charge stored in the fine particle layer acts on the detection electrode 23, and electric charge equivalent to the electric charge on the electrostatic information recording medium is induced on the surface of the detection electrode 23. Since the capacitor 27 is charged with electric charge equivalent in quantity but opposite in polarity to the induced charge, a potential difference according to the stored electric charge is produced between the electrodes of the capacitor. By reading this value with the voltmeter 29, the electric potential of the information electric charge can be obtained. By scanning the surface of the electrostatic information recording medium with the electric potential reading unit 21, an electrostatic latent image can be output in the form of an electric signal. It should be noted that, when the detection electrode 23 alone is used, the resolution may be reduced by the action of an electric field (electric lines of force) produced by the electric charge in a wider range than the region of the electrostatic information recording medium which faces the detection electrode. Therefore, a guard electrode 25 which is grounded may be disposed around the detection electrode. Thus, the electric lines of force are directed to extend perpendicularly to the plane, so that the electric lines of force only in the region facing the detection electrode 23 act. This makes it possible to read the electric potential at a region which has approximately the same area as that of the detection electrode. Because the accuracy and resolution of the potential reading greatly depend upon the shape and size of the detection electrode and the guard electrode, together with the distance from the electrostatic information recording medium, it is essential to design on the basis of optimal conditions obtained in conformity with the required performance. The potential may also be read optically by the photoelectric effect using a material having an electrooptic effect, for example, an optical crystal, e.g., $LiNbO_3$, or an organic optical material, e.g., a liquid crystal.

Figure 8:
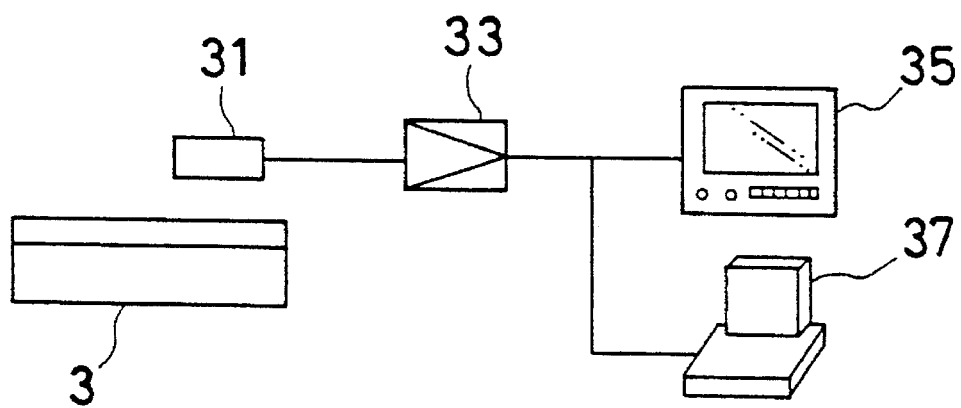
FIG. 8 schematically illustrates an arrangement for a method of reproducing the electrostatic information recorded on the first to fourth electrostatic information recording mediums according to the present invention.

FIG. 8 schematically shows an arrangement which may be employed to carry out the electrostatic information reproducing method. In the figure, reference numeral 31 denotes an electric potential reading unit, 33 an amplifier, 35 a CRT, and 37 a printer.

Referring to the figure, the electric charge potential is detected with the electric potential reading unit 31, and the detected output is amplified in the amplifier 33 and displayed on the CRT 35. It can also be printed out from the printer 37. In this case, it is possible to select any portion which is desired to read and to output the read electric potential at any desired time. It is also possible to reproduce the information repeatedly. In addition, it is also possible to read optically by use of a material whose optical properties change with the electric field, for example, an electrooptic crystal. Since the electrostatic latent image can be obtained in the form of an electric signal, it can also be utilized for, for example, recording onto another recording medium, if necessary.

Figure 9:
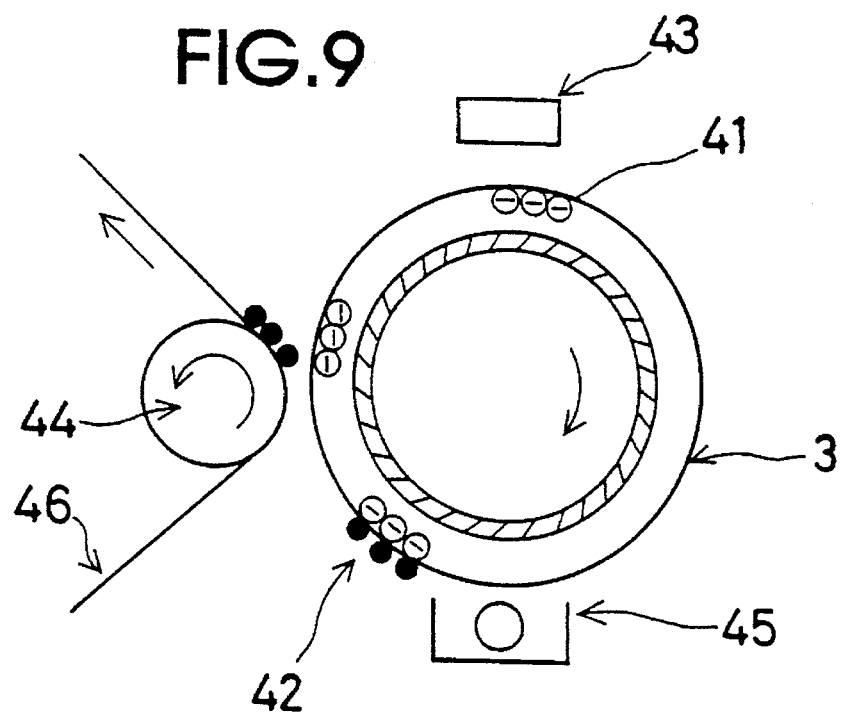
FIG. 9 illustrates the arrangement of a multi-printer using the electrostatic information recording medium of the present invention.

The electrostatic information, e.g., characters, images, etc., recorded on the electrostatic information recording medium of the present invention can be stored semipermanently without decaying practically. Accordingly, if the electrostatic information recording medium is used, for example, as a recording drum for an ion flow printer, it is possible to construct a so-called multi-printer in which recording of print information is carried out only once by the ion flow printer and a desired number of hard copies can be obtained thereafter. FIG. 9 shows one example of the multi-printer. In the figure, reference numeral 3 denotes a drum-shaped electrostatic information recording medium, 41 electrostatic charge, 42 toner, 43 an ion head, 44 a transfer means, 45 a toner developing device, and 46 transfer paper.

As shown in the figure, while the electrostatic information recording medium 3 of the present invention, which is formed in the shape of a drum, is being rotated, the ion head 43 is driven on the basis of signal information or the like to give the electrostatic information recording medium electrostatic charge 41 corresponding to the information, and then the electrostatic charge is developed with toner. Thereafter, the toner is transferred to the transfer paper 56 electrostatically or by fusing, thereby enabling a hard copy to be obtained. Since the electrostatic information recording medium of the present invention is superior in the electric charge retaining performance, a desired number of hard copies can be obtained by driving the ion head 43 only once on the basis of signal information or the like.

The present invention will be described below by way of examples. It should be noted that in the following description Examples 1 to 13 are concerned with the first electrostatic information recording medium, while Examples 14 to 17 are concerned with the second electrostatic information recording medium, and Example 18 and those following it relate to the third or fourth electrostatic information recording medium.

EXAMPLE 1

1.2 mg of o-phenylenediamine, 2.6 g of fluorocarbon resin (Cytop, trade name, manufactured by Asahi Glass Company, Ltd.), and 50 g of perfluoro-(2-butyltetrahydrofuran) as a solvent were put in a mayonnaise bottle, and glass beads No. 1 were added thereto until the volume thereof accounted for about 80%. Then, the mayonnaise bottle was shaken for 12 hours with a shaker (Red Devil), thereby preparing an organic substance fine particle dispersion.

The dispersion was coated on an ITO transparent electrode (thickness: about 500 Å; resistance: 80 ohm/sq.) by a spin coater (600 rpm; 20 sec) and air-dried for 1 hour and then dried for 1 hour in an oven at 150° C., thereby obtaining an electrostatic information recording medium A having a film thickness of 2.4 μm.

Electrostatic information recording mediums B and C were prepared in the same manner as the above by using m-phenylenediamine and p-phenylenediamine, respectively, in place of the o-phenylenediamine in the electrostatic information recording medium A.

The surface of the electric charge retaining layer in each electrostatic information recording medium was charged by a corona charger so that the surface potential was +100 V for one sample and −100 V for another. Thereafter, each electrostatic information recording medium was allowed to stand for 30 days under three different test conditions: (1) indoor conditions (ordinary temperature and humidity); (2) accelerated test conditions of 60° C. and 25% RH; and (3) accelerated test conditions of 40° C. and 95% RH. Thereafter, electric charge retaining performance was measured for each of the test conditions. The results are shown in Table below.

| Electrostatic information recording medium | After standing for 30 days under indoor conditions (ordinary temperature & humidity) | After standing for 30 days at 60° C. & 25% RH | After standing for 30 days at 40° C. & 95% RH |
| --- | --- | --- | --- |
| A | ±95 V | +85 V : −90 V | ±95 V |
| B | ±95 V | +85 V : −90 V | ±95 V |
| C | ±95 V | +85 V : −90 V | ±95 V |

Figure 10:
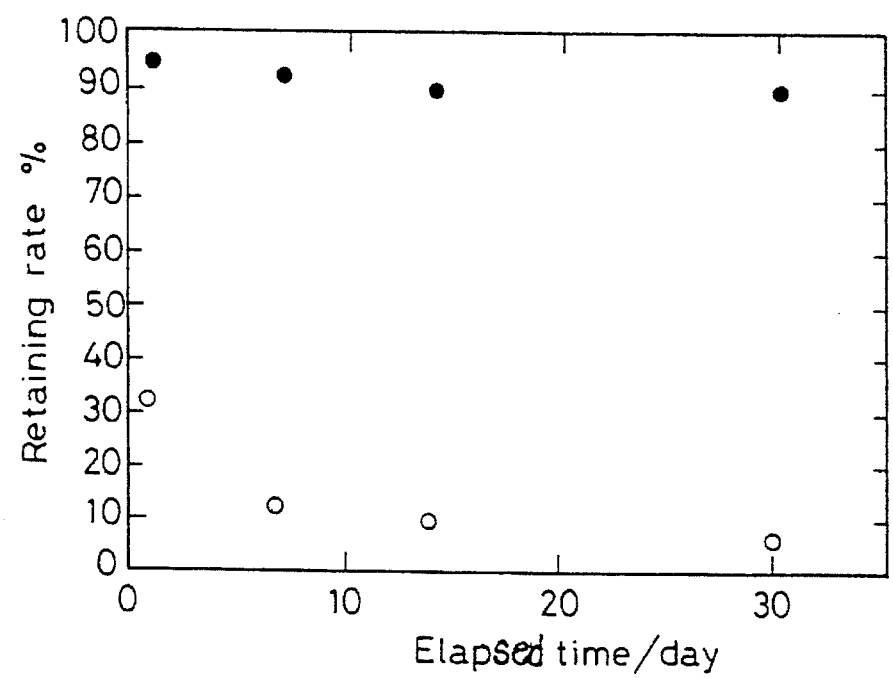
FIG. 10 is a graph showing the change of the positive electric charge retaining rate with time in regard to an electrostatic information recording medium C having p-phenylenediamine dispersed in the electric charge retaining layer in a case where it was stored under the conditions of 60° C. and 25% RH.

FIG. 10 shows the change of the positive electric charge retaining rate with time in regard to the electrostatic information recording medium C having p-phenylenediamine dispersed therein in a case where it was stored under the conditions of 60° C. and 25% RH. In the figure, ● represents the electrostatic information recording medium C, and ○ represents an electrostatic information recording medium prepared in the same way as the electrostatic information recording medium C except that no p-phenylenediamine was added thereto.

It will be understood from the figure that the electrostatic information recording medium C having p-phenylenediamine dispersed therein has excellent electric charge retaining characteristics even under high-temperature conditions in comparison to the electrostatic information recording medium prepared without adding p-phenylenediamine thereto.

Further, electrostatic information recording mediums having p-phenylenediamine dispersed therein were prepared in the same way as the above except that the thickness of the electric charge retaining layer was about 2 μm. Then, the respective electric charge retaining layers of the electrostatic information recording mediums prepared were subjected to corona charging so that surface potentials of 320 V (a), +160 V (b), +80 V (c) and +40 V (d) were set up, respectively. Then, the electric charge retaining layer of each electrostatic information recording medium was raised in temperature from 20° C. to 220° C., and thermally stimulated currents were measured during the rise in temperature.

Figure 11:
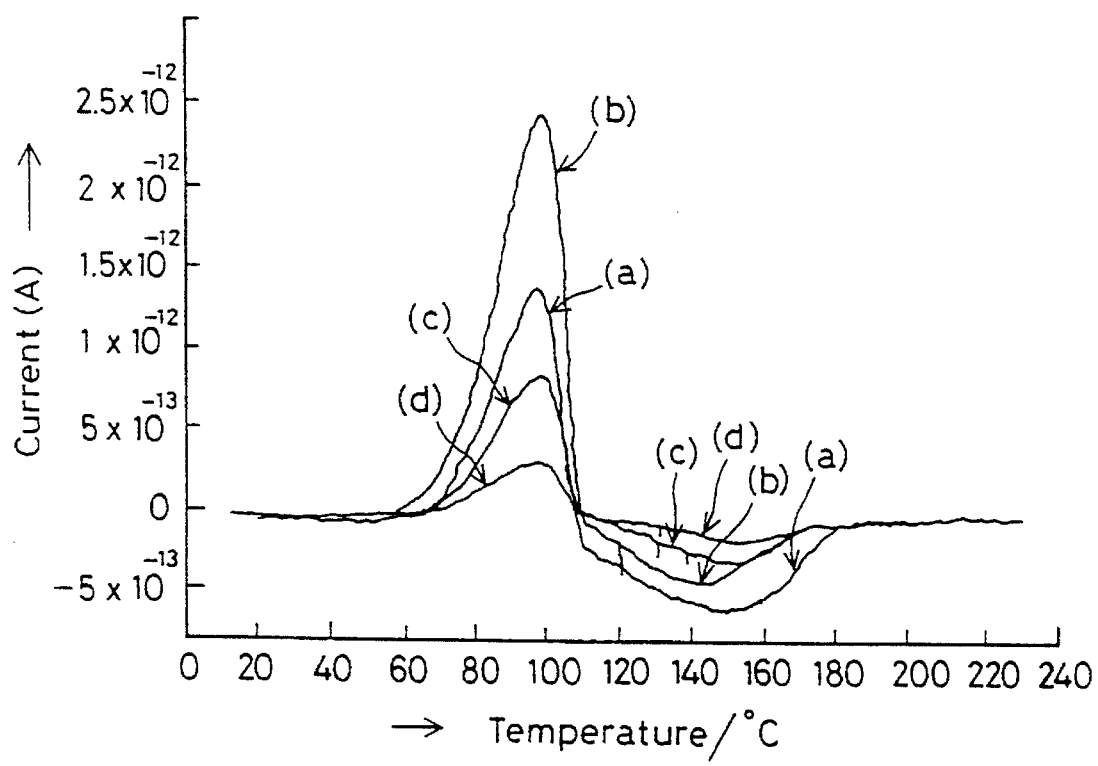
FIG. 11 is a graph showing thermally stimulated current spectra of electrostatic information recording mediums having p-phenylenediamine dispersed in their electric charge retaining layers.

The results of the measurement are shown in FIG. 11. In the meantime, the electrostatic information recording mediums were negatively charged, and thermally stimulated currents were measured in the same way as the above. However, no hetero-current was induced.

Figure 12:
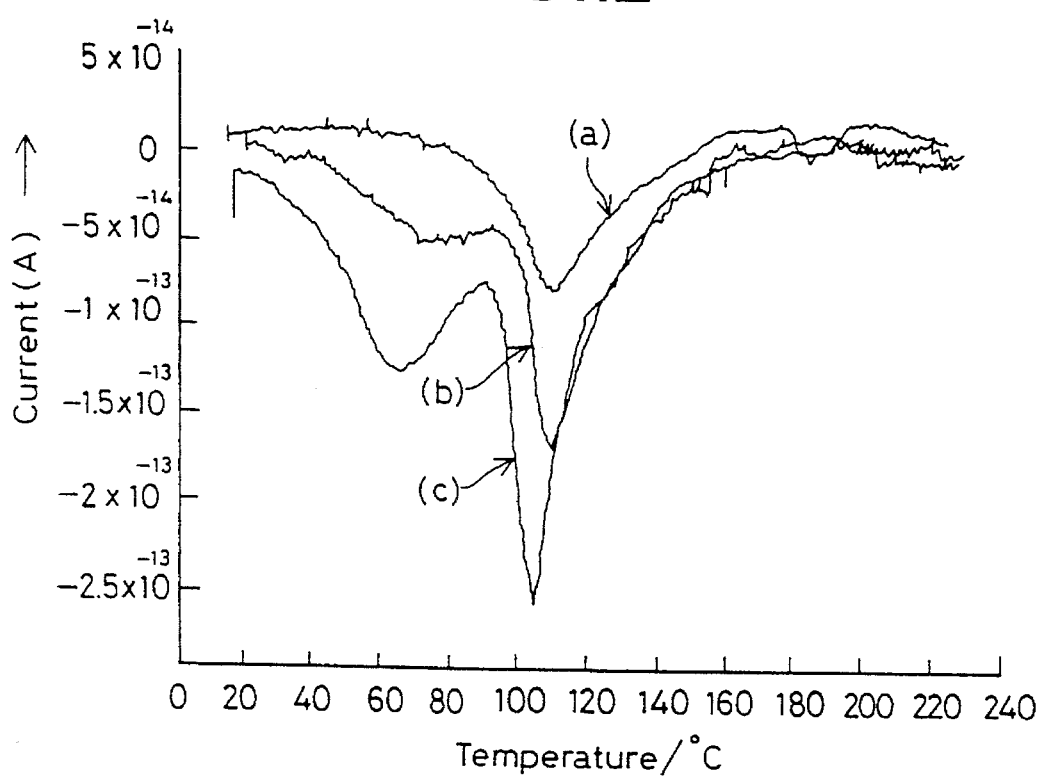
FIG. 12 is a graph showing thermally stimulated current spectra of electrostatic information recording mediums having no organic substance fine particles dispersed in their electric charge retaining layers.

Further, electrostatic information recording mediums were prepared in the same way as the above except that no organic substance fine particles were dispersed therein, and positively charged in the same way as the above. Then, thermally stimulated currents were measured in the same way as the above. The results of the measurement are shown in FIG. 12. In the figure, a represents an electrostatic information recording medium having an initial potential of +40 V, b another medium having an initial potential of +100 V, and c still another medium having an initial potential of +200 V.

As will be understood from the figures, when an electrostatic information recording medium having an organic substance fine particles dispersed therein is positively charged, a hetero-peak appears in the thermally stimulated current spectrum thereof.

Figure 13:
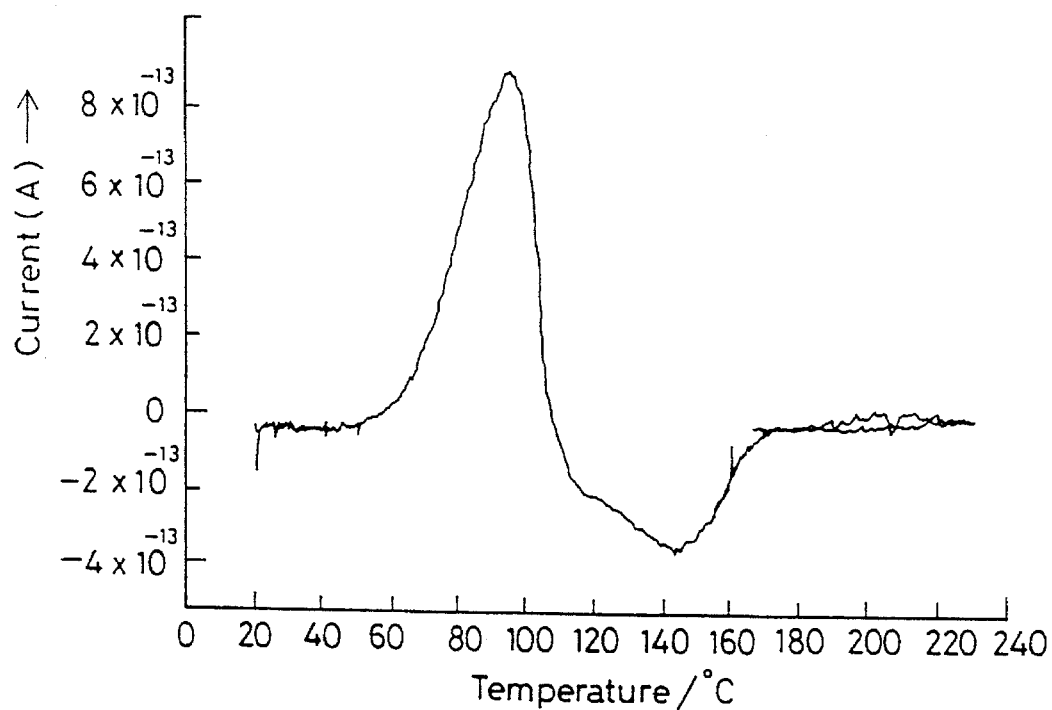
FIG. 13 is a graph showing a thermally stimulated current spectrum of an electrostatic information recording medium having o-phenylenediamine dispersed in its electric charge retaining layer.
Figure 14:
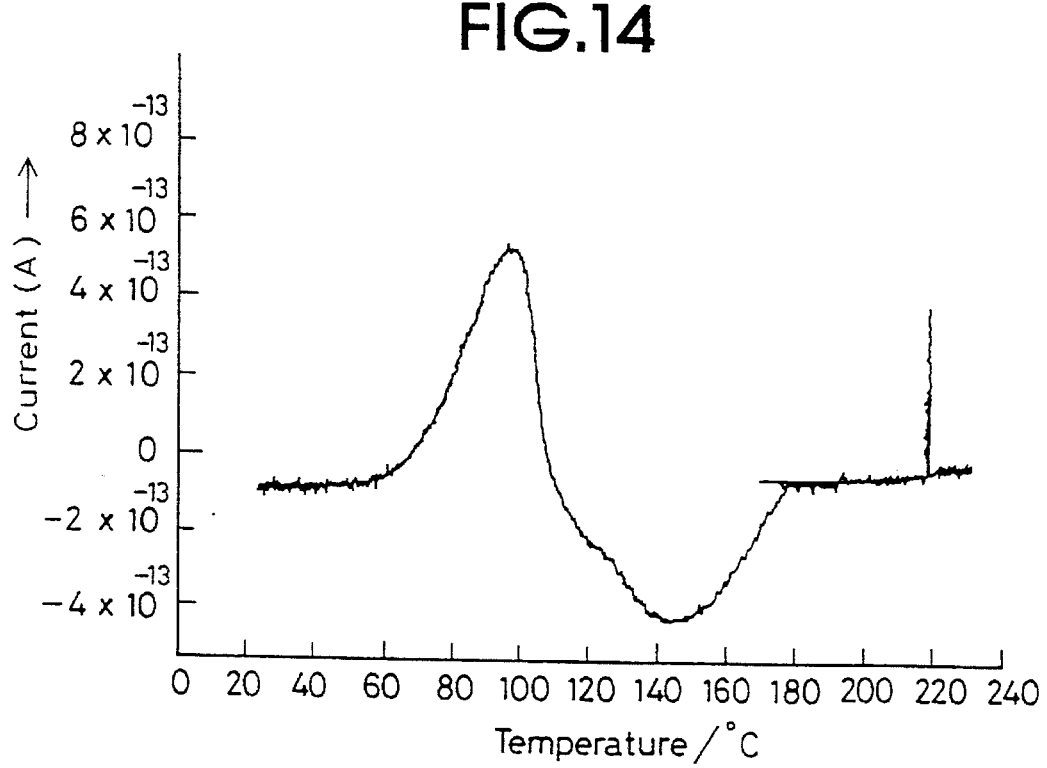
FIG. 14 is a graph showing a thermally stimulated current spectrum of an electrostatic information recording medium having m-phenylenediamine dispersed in its electric charge retaining layer.

FIG. 13 shows the results of measurement of thermally stimulated currents in the electrostatic information recording medium A charged so that the surface potential was +80 V. FIG. 14 shows the results of measurement of thermally stimulated currents in the electrostatic information recording medium B charged so that the surface potential was +100 V. In these cases, the thermally stimulated currents were measured in the same way as the above.

EXAMPLE 2

1.2 mg of p-phenylenediamine, 2.6 g of fluorocarbon resin (Teflon AF1600, trade name, manufactured by Du Pont Co., Ltd.), and 50 g of Florinato FC-40 (trade name, manufactured by 3M (K.K.)) as a solvent were put in a mayonnaise bottle, and glass beads No. 1 were added thereto until the volume thereof accounted for 80%. Then, the mayonnaise bottle was shaken for 12 hours with a shaker (Red Devil), thereby preparing an organic substance fine particle dispersion.

By using this dispersion, an electrostatic information recording medium was prepared in the same way as in Example 1, and the electric charge retaining performance of the medium was measured in the same way as in Example 1.

After the electrostatic information recording medium had been allowed to stand for 30 days at 60° C. and 25% RH, the surface electric charge was measured. As a result, it was revealed that the electrostatic information recording medium had surface potentials of +50 V and −85 V, which proves that both positive electric charge and negative electric charge can satisfactorily be retained.

Thermally stimulated currents in this electrostatic information recording medium were measured in the same way as in Example 1. As a result, it was confirmed that the thermally stimulated current spectrum had a hetero-peak similar to the above.

EXAMPLE 3

Electrostatic information recording mediums D, E and F were prepared in the same manner as in Example 1 by using 1.75 mg of 1,5-diaminonaphthalene, 1,8-diaminonaphthalene, and 2,3-diaminonaphthalene, respectively, in place of the o-phenylenediamine in Example 1, and the electric charge retaining performance of each medium was measured in the same way as in Example 1.

After the electrostatic information recording mediums had been allowed to stand for 30 days at 60° C. and 25% RH, the surface electric charge was measured for each medium. As a result, it was revealed that the electrostatic information recording medium D had surface potentials of +71 V and −90 V, while the electrostatic information recording medium E had surface potentials of +90 V and −90 V, and the electrostatic information recording medium F had surface potentials of +60 V and −90 V. Thus, it has been proved that both positive electric charge and negative electric charge can satisfactorily be retained.

Thermally stimulated currents in the electrostatic information recording mediums D, E and F were measured in the same way as in Example 1. As a result, it was confirmed that the thermally stimulated current spectra had a hetero-peak similar to the above.

EXAMPLE 4

Electrostatic information recording mediums G and H were prepared in the same manner as in Example 1 by using 1.85 mg of o-dinitrobenzene and m-dinitrobenzene, respectively, in place of the o-phenylenediamine in Example 1, and the electric charge retaining performance of each medium was measured in the same way as in Example 1.

After the electrostatic information recording mediums had been allowed to stand for 30 days at 60° C. and 25% RH, the surface electric charge was measured for each medium. As a result, it was revealed that the electrostatic information recording medium G had surface potentials of +80 V and −90 V, and the electrostatic information recording medium H also had surface potentials of +80 V and −90 V. Thus, it has been proved that both positive electric charge and negative electric charge can satisfactorily be retained.

Thermally stimulated currents in the electrostatic information recording mediums G and H were measured in the same way as in Example 1. As a result, it was confirmed that the thermally stimulated current spectra had a hetero-peak similar to the above.

EXAMPLE 5

Electrostatic information recording mediums I, J, K, L and M were prepared in the same manner as in Example 1 by using 1.6 mg of p-dichlorobenzene, 2.0 mg of 1,2,3-trichlorobenzene, 2.0 mg of 1,2,4-trichlorobenzene, 2.0 mg of 1,3,5-trichlorobenzene, and 3.15 mg of 1,2,3,4,5,6-hexachlorobenzene, respectively, in place of the o-phenylenediamine in Example 1, and the electric charge retaining performance of each medium was measured in the same way as in Example 1.

After the electrostatic information recording mediums had been allowed to stand for 30 days at 60° C. and 25% RH, the surface electric charge was measured for each medium. As a result, it was revealed that the electrostatic information recording medium I had surface potentials of +75 V and −90 V; the electrostatic information recording medium J had surface potentials of +75 V and −90 V; the electrostatic information recording medium K had surface potentials of +75 V and −90 V; the electrostatic information recording medium L had surface potentials of +75 V and −90 V; and the electrostatic information recording medium M had surface potentials of +70 V and −90 V. Thus, it has been proved that both positive electric charge and negative electric charge can satisfactorily be retained.

Thermally stimulated currents in the electrostatic information recording mediums I, J, K, L and M were measured in the same way as in Example 1. As a result, it was confirmed that the thermally stimulated current spectra had a hetero-peak similar to the above.

EXAMPLE 6

Electrostatic information recording mediums N, O, P, Q, R and S were prepared in the same manner as in Example 1 by using 1.5 mg of 1-nitroaniline, 1.5 mg of 2-nitroaniline, 1.5 mg of 3-nitroaniline, 1.7 mg of 1-amino-3-nitroaniline, 1.7 mg of 1-amino-2-nitroaniline, and 1.7 mg of 1-nitro-2-aminoaniline, respectively, in place of the o-phenylenediamine in Example 1, and the electric charge retaining performance of each medium was measured in the same way as in Example 1.

After the electrostatic information recording mediums had been allowed to stand for 30 days at 60° C. and 25% RH, the surface electric charge was measured for each medium. As a result, it was revealed that the electrostatic information recording medium N had surface potentials of +30 V and −90 V; the electrostatic information recording medium O had surface potentials of +30 V and −90 V; the electrostatic information recording medium P had surface potentials of +30 V and −90 V; the electrostatic information recording medium Q had surface potentials of +80 V and −90 V; the electrostatic information recording medium R had surface potentials of +85 V and −90 V; and the electrostatic information recording medium S had surface potentials of +85 V and −90 V. Thus, it has been proved that both positive electric charge and negative electric charge can satisfactorily be retained.

Thermally stimulated currents in the electrostatic information recording mediums N, O, P, Q, R and S were measured in the same way as in Example 1. As a result, it was confirmed that the thermally stimulated current spectra had a hetero-peak similar to the above.

EXAMPLE 7

Electrostatic information recording mediums T, U and V were prepared in the same manner as in Example 1 by using 1.2 mg of polymethyl methacrylate fine particles (MP1451, MP-1000 and MP-1600, trade name, manufactured by Soken Kagaku-sha) having primary particle diameter distributions of 0.1 μm to 0.2 μm, 0.35 μm to 0.5 μm, and 0.6 μm to 0.9 μm, respectively, in place of the o-phenylenediamine in Example 1, and the electric charge retaining performance of each medium was measured in the same way as in Example 1.

After the electrostatic information recording mediums had been allowed to stand for 30 days at 60° C. and 25% RH, the surface electric charge was measured for each medium. As a result, it was revealed that the electrostatic information recording medium T had surface potentials of +46 V and −85 V; the electrostatic information recording medium U had surface potentials of +45 V and −86 V; and the electrostatic information recording medium V had surface potentials of +38 V and −85 V. Thus, it has been proved that both positive electric charge and negative electric charge can satisfactorily be retained, and that the smaller the particle diameter, the more excellent in the positive electric charge retaining performance.

Thermally stimulated currents in the electrostatic information recording mediums T, U and V were measured in the same way as in Example 1. As a result, it was confirmed that the thermally stimulated current spectra had a hetero-peak similar to the above.

EXAMPLE 8

Electrostatic information recording mediums W, X, Y, Z, a, b, c and d were prepared in the same manner as in Example 1 by using 3.5 mg of 2,4,7-trinitrofluorenone, 2.25 mg of 7,7,8,8-tetracyanoquinodimethane, 2.2 mg of phenothiazine, 2.8 mg of perylene, 1.6 mg of phthalic anhydride, 2.0 mg of fluorenyl, 2.7 mg of triphenylmethane, and 1.1 mg of maleic anhydride, respectively, in place of the o-phenylenediamine in Example 1, and the electric charge retaining performance of each medium was measured in the same way as in Example 1.

After the electrostatic information recording mediums had been allowed to stand for 30 days at 60° C. and 25% RH, the surface electric charge was measured for each medium. As a result, it was revealed that the electrostatic information recording medium W had surface potentials of +75 V and −90 V; the electrostatic information recording medium X had surface potentials of +73 V and −91 V; the electrostatic information recording medium Y had surface potentials of +72 V and −82 V; the electrostatic information recording medium Z had surface potentials of +70 V and −82 V; the electrostatic information recording medium a had surface potentials of +57 V and −82 V; the electrostatic information recording medium b had surface potentials of +73 V and −91 V; the electrostatic information recording medium c had surface potentials of +50 V and −65 V; and the electrostatic information recording medium d had surface potentials of +43 V and −78 V. Thus, it has been proved that both positive electric charge and negative electric charge can satisfactorily be retained.

Figure 15:
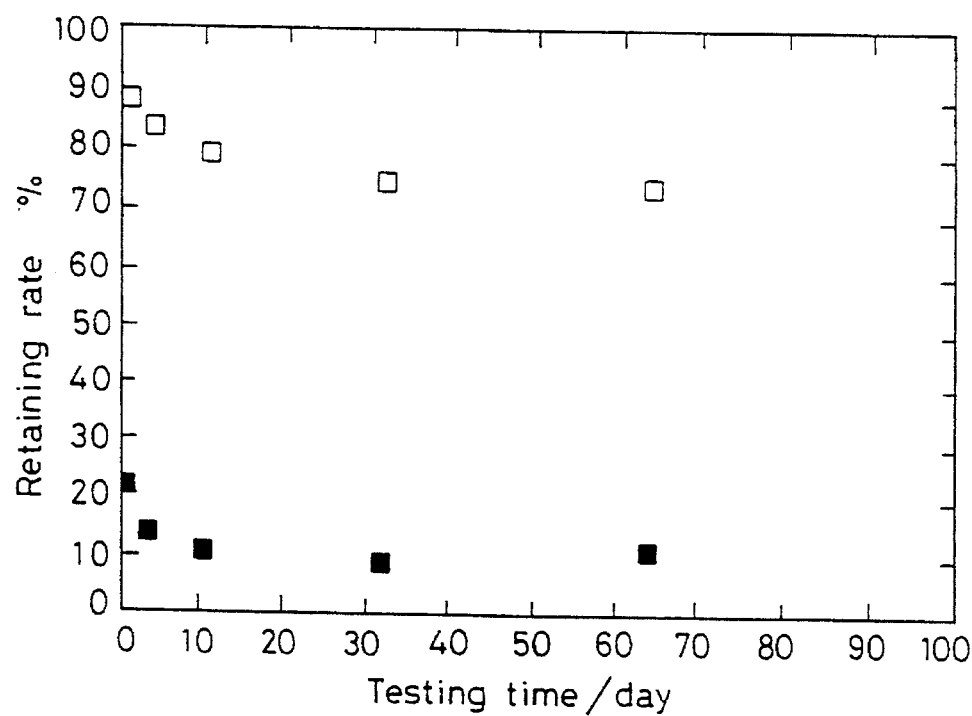
FIG. 15 is a graph showing the change of the electric charge retaining rate with time in regard to an electrostatic information recording medium W having 2,4,7-trinitrofluorenone dispersed in its electric charge retaining layer in a case where it was stored under the conditions of 60° C. and 25% RH.

FIG. 15 shows the change of the electric charge retaining rate with time in regard to the electrostatic information recording medium W having 2,4,7-trinitrofluorenone dispersed therein in a case where it was stored under the conditions of 60° C. and 25% RH. In the figure, □ represents the electrostatic information recording medium W, and ■ represents an electrostatic information recording medium prepared in the same way as the electrostatic information recording medium W except that no 2,4,7-trinitrofluorenone was dispersed therein.

It will be understood from the figure that the electrostatic information recording medium W having 2,4,7-trinitrofluorenone dispersed therein has excellent electric charge retaining characteristics even under the high-temperature conditions in comparison to the electrostatic information recording medium having no 2,4,7-trinitrofluorenone dispersed therein.

Thermally stimulated currents in the electrostatic information recording mediums W, X, Y, Z, a, b, c, and d were measured in the same way as in Example 1. As a result, it was confirmed that the thermally stimulated current spectra had a hetero-peak similar to the above.

EXAMPLE 9

Method of Preparation of Single-Layer Organic Photosensitive Member

A mixture having a composition consisting essentially of 10 g of poly-N-vinylcarbazole (manufactured by Anan Koryo (K.K.)), 10 g of 2,4,7-trinitrofluorenone, 2 g of polyester resin (binder: Byron 200; manufactured by Toyo Spinning Co., Ltd.), and 90 g of tetrahydrofuran (THF) was prepared in the dark and applied by using a doctor blade to a glass substrate (1 mm thick) having $In_2O_3$—$SnO_2$ deposited thereon to a thickness of about 1,000 Å by sputtering, and then subjected to through-flow drying for about 1 hour at 60° C., thereby obtaining a photosensitive member having a photoconductive layer with a thickness of about 10 μm. The photosensitive member was further dried naturally for 1 day in order to dry it completely.

Electrostatic Information Recording and Reproducing Method

The photosensitive member prepared above and the electrostatic information recording medium having p-phenylenediamine dispersed therein, prepared in Example 1, were placed face-to-face with each other across a spacer comprising a polyester film having a thickness of 10 μm so that the surface of the electrostatic information recording medium and the photoconductive layer side of the photosensitive member faced each other and grounded. Then, a DC voltage of ±600 V was applied between the two electrodes.

With the voltage being applied in this way, exposure was carried out for 1 second from the photosensitive member side with a 1,000 lux halogen lamp used as a light source, thus completing formation of an electrostatic latent image.

Then, the potential difference between the electrode and the surface of the medium was measured. As a result, surface potentials of +80 V and −80 V were measured at the surface of the medium with a surface potential measuring device, while the surface potential at the unexposed region was ±10 V.

After the electrostatic information recording medium had been allowed to stand for 30 days at 60° C. and 25% RH, the surface electric charge was measured. As a result, it was revealed that the electrostatic information recording medium had surface potentials of +75 V and −75 V. Thus, it is proved that both positive electric charge and negative electric charge can satisfactorily be retained.

EXAMPLE 10

0.0195 g of p-phenylenediamine was dissolved in 20 g of a mixed solvent comprising Piccolastic D125 (trade name, manufactured by Rika Hercules Co.) and xylene in the ratio of 3:7 to prepare a 0.33 wt % solution.

This solution was coated on an ITO transparent electrode (film thickness: about 500 Å; and resistance: 80 ohm/sq.) by using a spin coater (1000 rpm; 20 sec) and then dried for 1 hour in an oven at 100° C. to obtain an electrostatic information recording medium having a thickness of 5 μm.

Figure 16:
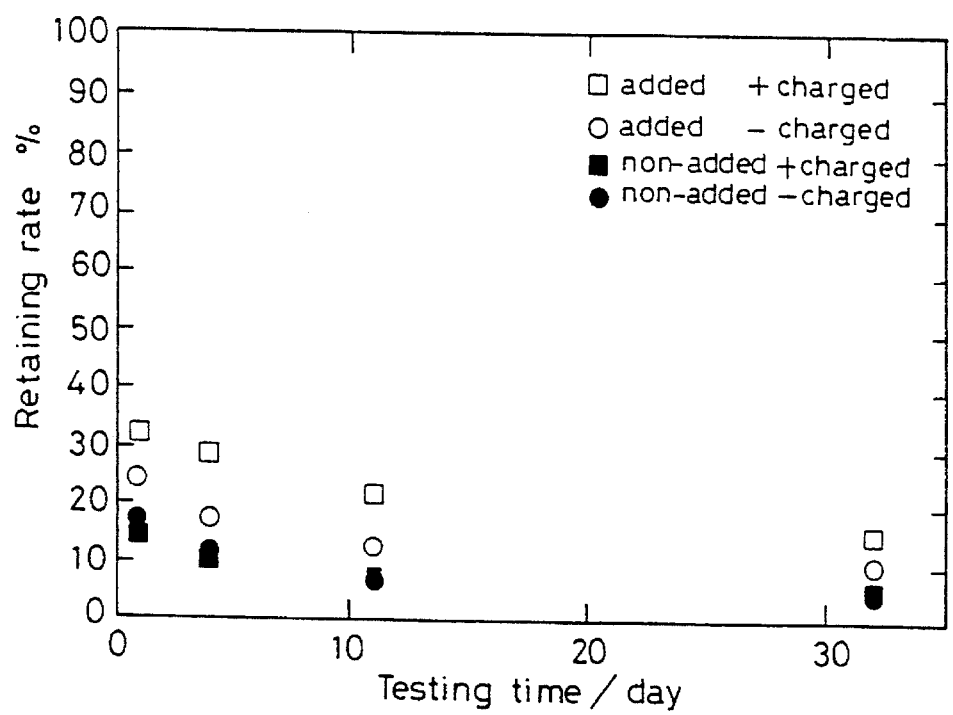
FIG. 16 is a graph showing the change of the electric charge retaining rate with time in regard to an electrostatic information recording medium having p-phenylenediamine added to its electric charge retaining layer in a case where it was stored under the conditions of 60° C. and 25% RH.

The surface of the electric charge retaining layer in the electrostatic information recording medium was charged by a corona charger so that the surface potential was +180 V for one sample and −180 V for another. Thereafter, the electric charge retaining performance was measured under the high-temperature conditions of 60° C. and 25% RH as an accelerated test. The results of the measurement are shown in FIG. 16.

Figure 17:
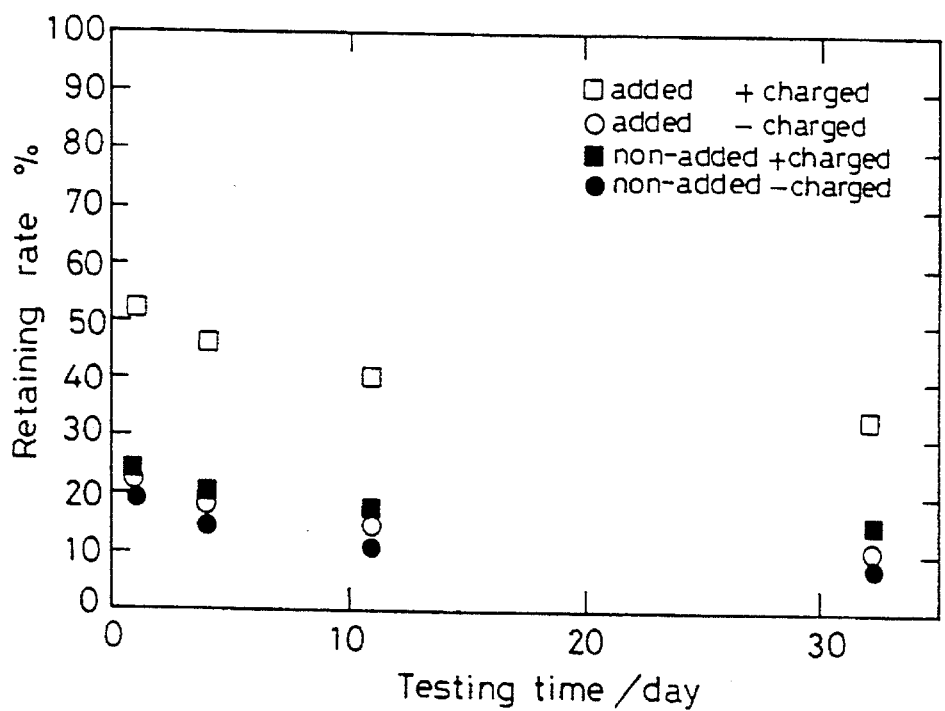
FIG. 17 is a graph showing the change of the electric charge retaining rate with time in regard to an electrostatic information recording medium having p-phenylenediamine added to its electric charge retaining layer in a case where it was stored under the conditions of 40° C. and 95% RH.

Further, the electric charge retaining performance under the high-humidity conditions of 40° C. and 95% RH was measured. The results of the measurement are shown in FIG. 17.

Figure 18:
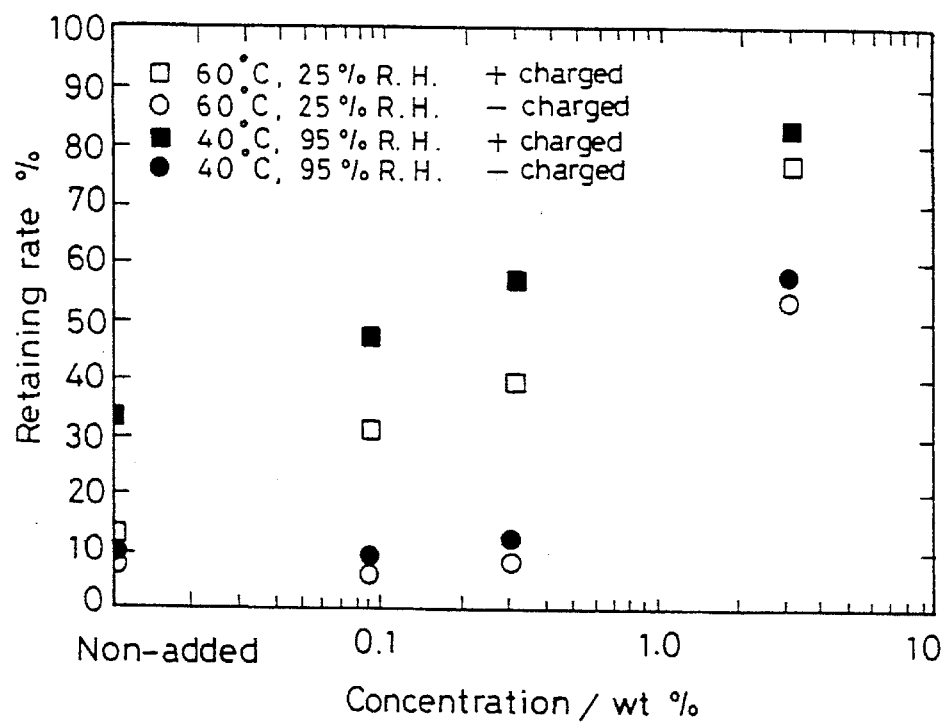
FIG. 18 is a graph showing the relationship between the electric charge retaining rate and the p-phenylenediamine concentration in the electric charge retaining layer in a case where electrostatic information recording mediums having p-phenylenediamine added to their electric charge retaining layers were stored under the conditions of 60° C., 25% RH and 40° C., 95% RH.

In the meantime, electrostatic information recording mediums were prepared in the same way as the above except that solutions respectively having organic substance concentrations of 3.3 wt % and 0.1 wt % were used, and then charged. One day after the charging process, the electric charge retaining performance of each medium was measured in the same way as the above. The results of the measurement are shown in FIG. 18.

It will be understood from the figure that the electrostatic information recording medium of the present invention is superior in the electric charge retaining performance, particularly in the positive electric charge retaining performance, and that the electric charge retaining performance improves as the organic substance concentration rises.

EXAMPLE 11

0.0179 mg of phenothiazine was dissolved in 20 g of a mixed solvent comprising Piccolastic D125 (trade name, manufactured by Rika Hercules Co.) and xylene in the ratio of 3:7 to prepare a 0.3 wt % solution. By using this solution, an electrostatic information recording medium was obtained under the same conditions as in Example 10.

Figure 19:
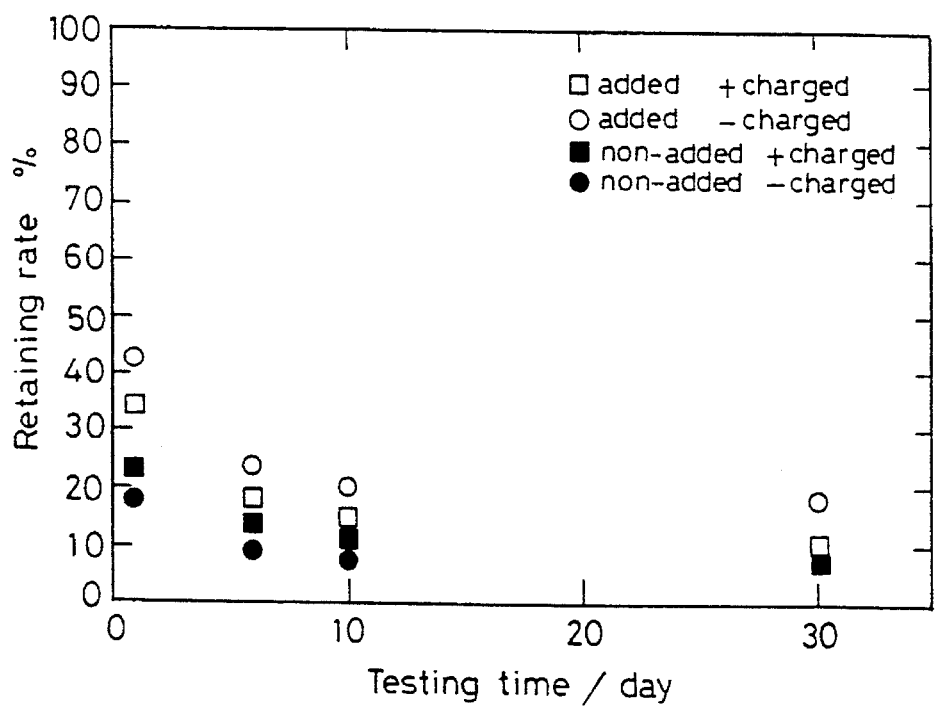
FIG. 19 is a graph showing the change of the electric charge retaining rate with time in regard to an electrostatic information recording medium having phenothiazine added to its electric charge retaining layer in a case where it was stored under the conditions of 60° C. and 25% RH.

The surface of the electric charge retaining layer in the electrostatic information recording medium was charged by a corona charger so that the surface potential was +170 V for one sample and −170 V for another. Thereafter, the electric charge retaining performance was measured under the high-temperature conditions of 60° C. and 25% RH as an accelerated test. The results of the measurement are shown in FIG. 19.

Figure 20:
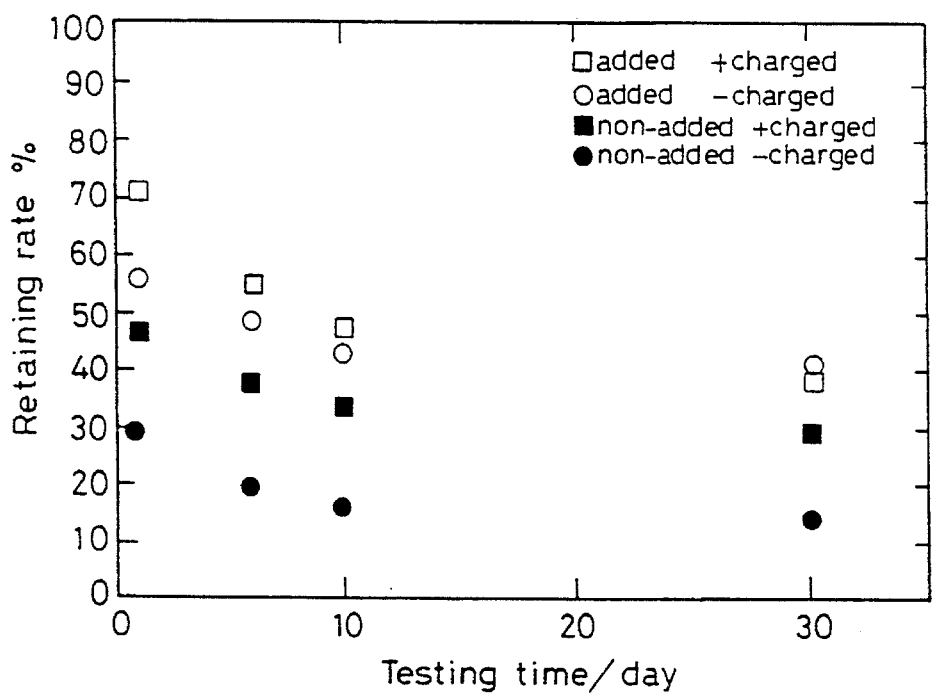
FIG. 20 is a graph showing the change of the electric charge retaining rate with time in regard to an electrostatic information recording medium having phenothiazine added to its electric charge retaining layer in a case where it was stored under the conditions of 40° C. and 95% RH.

Further, the electric charge retaining performance under the high-humidity conditions of 40° C. and 95% RH was measured. The results of the measurement are shown in FIG. 20.

EXAMPLE 12

0.0284 mg of 2,4,7-trinitro-9-fluorenone was dissolved in 20 g of a mixed solvent comprising Piccolastic D125 (trade name, manufactured by Rika Hercules Co.) and xylene in the ratio of 3:7 to prepare a 0.47 wt % solution. By using this solution, an electrostatic information recording medium was obtained under the same conditions as in Example 10.

Figure 21:
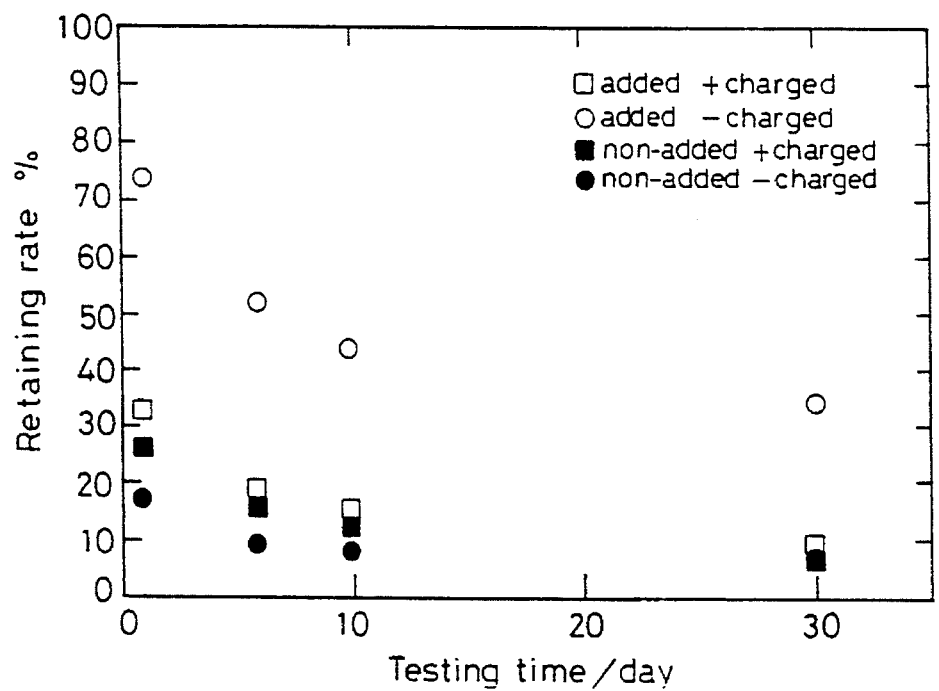
FIG. 21 is a graph showing the change of the electric charge retaining rate with time in regard to an electrostatic information recording medium having trinitrofluorenone added to its electric charge retaining layer in a case where it was stored under the conditions of 60° C. and 25% RH.

The surface of the electric charge retaining layer in the electrostatic information recording medium was charged by a corona charger so that the surface potential was +170 V for one sample and −170 V for another. Thereafter, the electric charge retaining performance was measured under the high-temperature conditions of 60° C. and 25% RH as an accelerated test. The results of the measurement are shown in FIG. 21.

Figure 22:
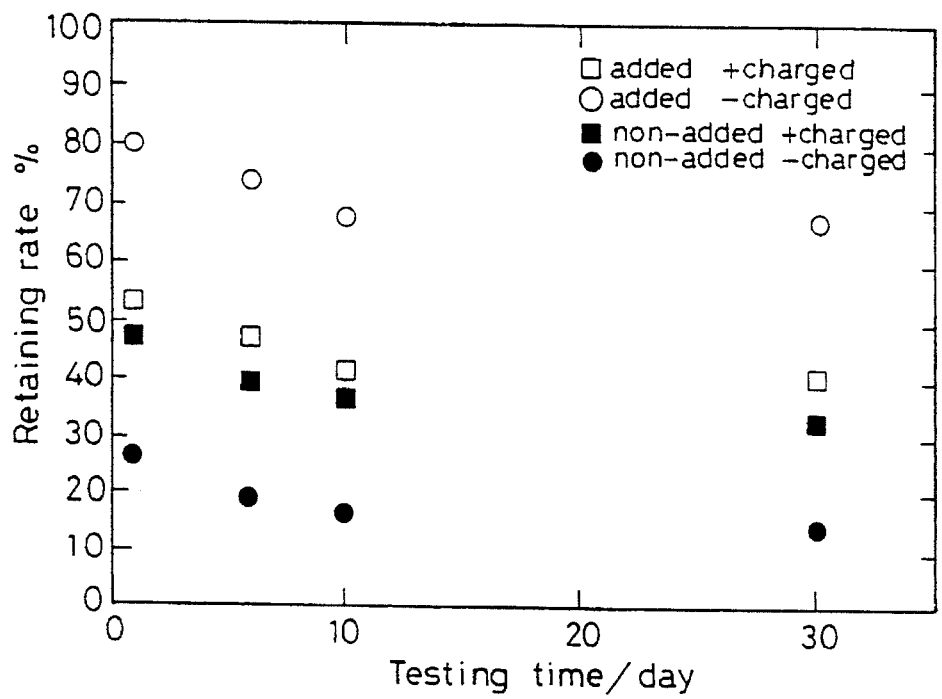
FIG. 22 is a graph showing the change of the electric charge retaining rate with time in regard to an electrostatic information recording medium having trinitrofluorenone added to its electric charge retaining layer in a case where it was stored under the conditions of 40° C. and 95% RH.

Further, the electric charge retaining performance under the high-humidity conditions of 40° C. and 95% RH was measured. The results of the measurement are shown in FIG. 22.

Figure 23:
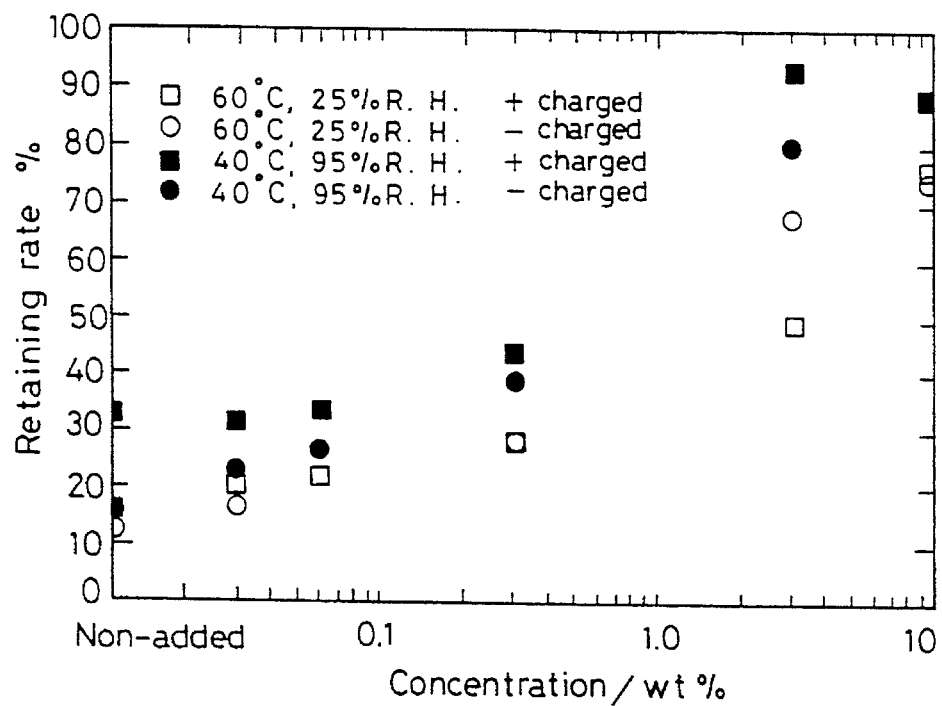
FIG. 23 is a graph showing the relationship between the electric charge retaining rate and the trinitrofluorenone concentration in the electric charge retaining layer in a case where an electrostatic information recording medium having trinitrofluorenone added to its electric charge retaining layer was stored under the conditions of 60° C., 25% RH and 40° C., 95% RH.

In the meantime, electrostatic information recording mediums were prepared in the same way as the above except that solutions respectively having organic substance concentrations of 0% (no organic substance added), 0.0047 wt %, 0.0094 wt % and 0.047 wt % were used, and then charged. One day after the charging process, the electric charge retaining performance of each medium was measured in the same way as the above. The results of the measurement are shown in FIG. 23.

It will be understood from the figure that the electrostatic information recording medium of the present invention is superior in the electric charge retaining performance, particularly in the positive electric charge retaining performance, and that the electric charge retaining performance improves as the organic substance concentration rises.

EXAMPLE 13

Electrostatic Information Recording and Reproducing Method

The photosensitive member prepared in Example 9 and the electrostatic information recording medium having 0.33 wt % of p-phenylenediamine dispersed in the electric charge retaining layer, prepared in Example 10, were placed face-to-face with each other across a spacer comprising a polyester film having a thickness of 10 μm so that the surface of the electrostatic information recording medium and the photoconductive layer side of the photosensitive member faced each other and grounded. Then, a DC voltage of ±600 V was applied between the two electrodes.

With the voltage being applied in this way, exposure was carried out for 1 second from the photosensitive member side with a 1,000 lux halogen lamp used as a light source, thus completing formation of an electrostatic latent image.

Then, the potential difference between the electrode and the surface of the medium was measured. As a result, surface potentials of +100 V and −100 V were measured at the surface of the medium with a surface potential measuring device, while the surface potential at the unexposed region was ±10 V.

After the electrostatic information recording medium had been allowed to stand for 30 days under ordinary temperature and humidity conditions, the surface electric charge was measured. As a result, it was revealed that the electrostatic information recording medium had surface potentials of +90 V and −80 V, and that the electric charge, particularly the positive electric charge was satisfactorily retained.

Examples of the second electrostatic information recording medium will be shown below.

EXAMPLE 14

A fluorine-containing resin (Teflon AF1600, trade name, manufactured by Du Pont Co., Ltd.; water absorption: not higher than 0.01%; resistivity: $1 \times 10^{18}$ ohm-cm) was dissolved in perfluoro-(2-butyltetrahydrofuran) to obtain a solution. This solution was coated on an ITO (indium-tin oxide) transparent electrode (thickness: 500 Å; resistance: 80 ohm/sq.) by spin coating (1000 rpm; 20 sec), air-dried for 1 hour and then dried for 1 hour in an oven at 200° C., thereby forming an electric charge retaining layer having a dry film thickness of 3 μm.

The surface of the electric charge retaining layer thus obtained was charged by a corona charger so that the surface potential was −120 V, and the electric charge retaining performance thereof was measured.

In an accelerated test where the surface potential of the electric charge retaining layer was measured after the electrostatic information recording medium had been allowed to stand for 30 days under the conditions of 60° C. and 25% RH, it was revealed that the electric charge retaining layer still maintained a residual potential of −91 V.

When the surface potential of the electric charge retaining layer was measured after the electrostatic information recording medium had been allowed to stand for 30 days at 40° C. and 95% RH, it was revealed that the electric charge retaining layer still maintained a residual potential of −104 V.

EXAMPLE 15

The surface of the electric charge retaining layer in the electrostatic information recording medium prepared in Example 14 was charged by a corona charger so that the surface potential was +120 V, and the electric charge retaining performance was measured.

In an accelerated test where the surface potential of the electric charge retaining layer was measured after the electrostatic information recording medium had been allowed to stand for 1 day under the conditions of 60° C. and 25% RH, it was revealed that the electric charge retaining layer still maintained a residual potential of +16 V. After the electrostatic information recording medium had been allowed to stand for 30 days under the same conditions, a residual potential of +5 V was still maintained.

When the surface potential of the electric charge retaining layer was measured after the electrostatic information recording medium had been allowed to stand for 1 day under the conditions of 40° C. and 95% RH, the electric charge retaining layer still maintained a residual potential of +29 V. After the electrostatic information recording medium had been allowed to stand for 30 days under the same condition, a residual potential of +11 V was still maintained.

EXAMPLE 16

On a glass substrate having a thickness of 1 mm, an Al electrode was stacked to a thickness of 1,000 Å by vacuum deposition method ($10^{-5}$ Torr). The surface of the Al electrode was coated by a blade coater with a solution of 5% a fluorine-containing resin (Teflon AF1600, trade name, manufactured by Du Pont Co., Ltd.; water absorption: not higher than 0.01%; resistivity: $1\times10^{18}$ ohm-cm) in perfluoro-(2-butyltetrahydrofuran), thereby producing an electric charge retaining layer having a dry film thickness of 3 μm.

The surface of the electric charge retaining layer was charged by a corona charger so that the surface potential was −100 V, and the electric charge retaining performance thereof was measured.

After the electrostatic information recording medium had been allowed to stand for 30 days under ordinary temperature and humidity conditions, the surface potential of the electric charge retaining layer was measured. As a result, it was revealed that the electric charge retaining layer still maintained a residual potential of −85 V. After the electrostatic information recording medium had been allowed to stand for 30 days at 60° C. and 25% RH as an accelerated test, the electric charge retaining layer still maintained a residual potential of −70 V. In an accelerated test where the electrostatic information recording medium was allowed to stand for 30 days at 40° C. and 95% RH, it was revealed that a residual potential of −80 V was still maintained.

EXAMPLE 17

Electrostatic Information Recording and Reproducing Method

The photosensitive member prepared in Example 9 and the electrostatic information recording medium prepared in Example 14 were placed face-to-face with each other across a spacer comprising a polyester film having a thickness of 10 μm so that the surface of the electrostatic information recording medium and the photoconductive layer side of the photosensitive member faced each other and grounded. Then, a DC voltage of −700 V was applied between the two electrodes in such a manner that the photosensitive member side was negative, while the electrostatic information recording medium side was positive.

With the voltage being applied in this way, exposure was carried out for 1 second from the photosensitive member side with a 1,000 lux halogen lamp used as a light source, thus completing formation of an electrostatic latent image.

Then, the potential difference between the electrode and the surface of the medium was measured. As a result, surface potential of −100 V was measured at the surface of the medium with a surface potential measuring device, while the surface potential at the unexposed region was −30 V. The medium that was subjected to exposure and voltage application by using a gray scale in the same way as the above had a surface potential pattern recorded thereon in analog form in the range of from −30 V to −100 V.

Even after the medium had been allowed to stand for 1 year at room temperature, substantially the same surface potential was maintained.

Next, Examples of the third or fourth electrostatic information recording medium will be shown below.

EXAMPLE 18

On a glass substrate having a thickness of 1 mm, indium-tin oxide (ITO; thickness: about 500 Å; resistance: 80 ohm/sq.) was stacked. The surface of the electrode was coated by spinner coating method (1000 rpm; 20 sec) with a solution of 7% a fluorocarbon resin (Cytop, trade name, manufactured by Asahi Glass Company, Ltd.) in a fluorine-containing solvent [perfluoro-(2-butyltetrahydrofuran)], thereby forming a resin layer having a dry film thickness of 2.9 μm.

With the above used as a substrate, selenium was deposited thereon for 10 minutes at a substrate heating temperature of 45° C. under a low vacuum (6 torr) so that the average particle diameter was not larger than 0.5 μm.

Further, the surface of the deposition layer was coated with the above-described fluorocarbon resin solution by spinner coating method so that the dry film thickness was 0.6 μm. In this way, various electrostatic information recording mediums were produced.

Next, the surface of the medium was charged in the dark by corona charging so that the surface potential was +120 V (−120 V), and then light was applied thereto. Consequently, the potential became +115 V (−115 V). Thus, internal electric charge was formed.

Even after this medium had been allowed to stand for 30 days under the high-temperature conditions of 60° C. and 20% RH as an accelerated test, it still retained a potential of +50 V (−100 V). Even after it had been allowed to stand for 30 days under the high-humidity conditions of 40° C. and 95% RH, the medium still maintained +50 V (−100 V).

Next, electrostatic information recording mediums which were different from each other in the thickness of the outermost fluorocarbon resin layer were prepared in the same way as the above and charged so that the surface potential was −120 V. Thereafter, light was applied thereto to form internal electric charge. The electric charge retaining rate was measured for each of the mediums after they had been allowed to stand for 1 day under the high-temperature conditions of 60° C. and 20% RH.

Figure 24:
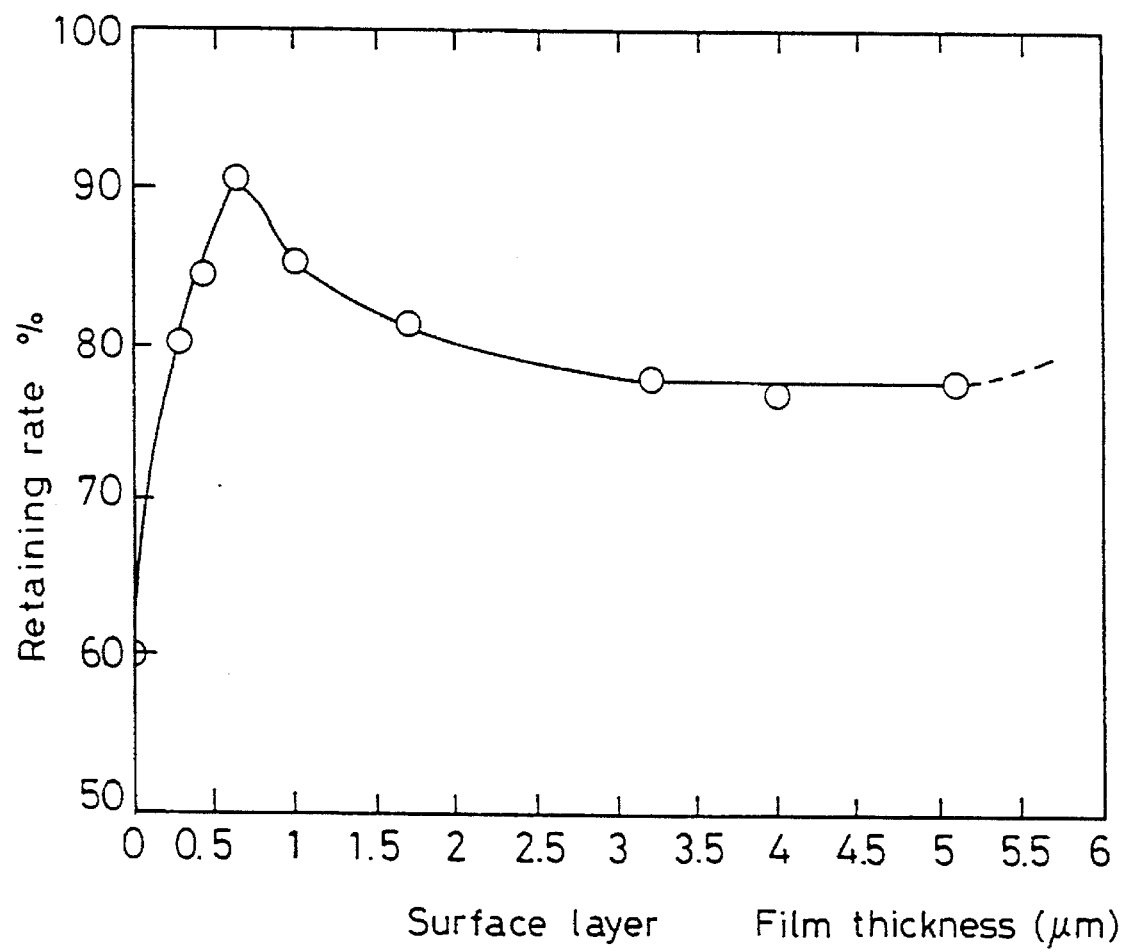
FIG. 24 is a graph for explanation of the relationship between the thickness of an insulating resin layer as the outermost surface layer and the electric charge retaining performance.

The results of the measurement are shown in FIG. 24. It will be understood that the electric charge retaining rate reaches a maximum value when the thickness of the outermost fluorocarbon resin layer is 0.6 μm.

EXAMPLE 19

An electrostatic information recording medium was prepared in the same way as in Example 18 except that tellurium was used as a deposition material in place of selenium and deposited for 7 minutes at a substrate heating temperature of 50° C. and a degree of vacuum of 3 torr, thereby forming a fine particle layer having an average particle diameter of not larger than 0.5 μm.

The surface of this medium was charged by corona charging so that the surface potential was +120 V (−120 V). Thereafter, the medium was allowed to stand for 30 days under the high-temperature conditions of 60° C. and 20% RH. Even after standing under such conditions, the medium still maintained a potential of +50 V (−100 V). Even after the medium had been allowed to stand for 30 days under the high-humidity conditions of 40° C. and 95% RH, it still maintained a surface potential of +50 V (−100 V).

EXAMPLE 20

An electrostatic information recording medium was prepared in the same way as in Example 18 except that zinc was used as a deposition material in place of selenium and deposited for 5 minutes at a substrate heating temperature of 50° C. to 60° C. and a degree of vacuum of 0.1 torr, thereby forming a fine particle layer having an average particle diameter of not larger than 0.5 um.

The surface of this medium was charged by corona charging so that the surface potential was +120 V (−120 V). Thereafter, the medium was allowed to stand for 30 days under the high-temperature conditions of 60° C. and 20% RH. Even after standing under such conditions, the medium still maintained a potential of +90 V (−100 V). Even after the medium had been allowed to stand for 30 days under the high-humidity conditions of 40° C. and 95% RH, it still maintained a surface potential of +85 V (−100 V).

EXAMPLE 21

An electrostatic information recording medium A was prepared in the same way as in Example 18 except that a dispersion, which was obtained by putting 1.2 mg of o-phenylenediamine, 2.6 g of fluorocarbon resin (Cytop, trade name, manufactured by Asahi Glass Company, Ltd.) and 50 g of perfluoro-(2-butyltetrahydrofuran) as a solvent in a mayonnaise bottle, adding glass beads No. 1 thereto until the volume thereof accounted for about 80%, and shaking the mayonnaise bottle for 12 hours with a shaker (Red Devil), was used as a fluorocarbon resin solution.

Electrostatic information recording mediums B and C were prepared in the same manner as the above by using m-phenylenediamine and p-phenylenediamine, respectively, in place of the o-phenylenediamine in the electrostatic information recording medium A.

The surface of the electric charge retaining layer in each electrostatic information recording medium was charged by a corona charger so that the surface potential was +120 V for one sample and −120 V for another. Thereafter, each electrostatic information recording medium was allowed to stand for 30 days under the conditions of 60° C. and 25% RH as an accelerated test, and then the electric charge retaining performance was measured. As a result, it was revealed that all the electrostatic information recording mediums A, B and C had surface potentials of +50 V and −100 V, and that these electrostatic information recording mediums were also superior in the positive electric charge retaining performance.

EXAMPLE 22

1.2 mg of o-phenylenediamine, 2.6 g of fluorocarbon resin (Teflon AF1600, trade name, manufactured by Du Pont Co., Ltd.), and 50 g of Florinato FC-40 (trade name, manufactured by 3M (K.K.)) as a solvent were put in a mayonnaise bottle, and glass beads No. 1 were added thereto until the volume thereof accounted for 80%. Then, the mayonnaise bottle was shaken for 12 hours with a shaker (Red Devil), thereby preparing an organic substance fine particle dispersion.

By using this dispersion, an electrostatic information recording medium was prepared in the same way as in Example 18, and the electric charge retaining performance thereof was measured in the same way as in Example 18.

After the electrostatic information recording medium had been allowed to stand for 30 days at 60° C. and 20% RH, the surface electric charge thereof was measured. As a result, it was revealed that the medium had surface potentials of +50 V and −100 V. Thus, it has been proved that both positive electric charge and negative electric charge can satisfactorily be retained.

EXAMPLE 23

An electrostatic information recording medium was prepared in the same way as in Example 18 except that an aluminum-deposited polyethylene terephthalate film (thickness: 20 μm) was used in place of the glass provided with the fluorocarbon resin-coated ITO electrode.

The surface of this medium was charged by corona charging so that the surface potential was +800 V for one sample and −800 V for another. When the surface potential was measured after the medium had been allowed to stand for 90 days at 60° C. and 20% RH, it was revealed that the medium still maintained surface potentials of +580 V and −750 V.

EXAMPLE 24

Electrostatic Information Recording and Reproducing Method

The photosensitive member prepared in Example 9 and the electrostatic information recording medium prepared in Example 18 were placed face-to-face with each other across a spacer comprising a polyester film having a thickness of 10 μm so that the surface of the electrostatic information recording medium and the photoconductive layer side of the photosensitive member faced each other and grounded. Then, a DC voltage of ±600 V was applied between the two electrodes.

With the voltage being applied in this way, exposure was carried out for 1 second from the photosensitive member side with a 1,000 lux halogen lamp used as a light source, thus completing formation of an electrostatic latent image.

Then, the potential difference between the electrode and the surface of the medium was measured. As a result, surface potentials of +80 V and −80 V were measured at the surface of the medium with a surface potential measuring device, while the surface potential at the unexposed region was ±10 V.

After the electrostatic information recording medium had been allowed to stand for 30 days at 60° C. and 20% RH, the surface potential was measured. As a result, it was revealed that the electrostatic information recording medium had surface potentials of +35 V and −70 V, and that both the positive electric charge and negative electric charge were satisfactorily retained.

COMPARATIVE EXAMPLE 1

On a glass substrate having a thickness of 1 mm, ITO was stacked, and a 7% solution of a fluorocarbon resin (Cytop, trade name, manufactured by Asahi Glass Company, Ltd.) in a fluorine-containing solvent was coated on the electrode by spinner coating method (1000 rpm; 20 sec) so that the dry film thickness was 2.9 μm.

Next, the surface of this medium was charged by corona charging so that the surface potential was +100 V for one sample and −100 V for another. Thereafter, the medium was allowed to stand for 30 days under the high-temperature conditions of 60° C. and 20% RH. As a result, the potential became +10 V and −100 V. After the medium was allowed to stand for 30 days under the high-humidity conditions of 40° C. and 95% RH, the potential became +20 V and −100 V.

COMPARATIVE EXAMPLE 2

On ITO stacked on a glass substrate having a thickness of 1 mm, a 50% solution of a thermoplastic resin (Stebelite ester 10, trade name, manufactured by Rika Hercules Co.; softening point: 71° C. to 78° C.) in monochlorobenzene was coated by spin coating method (2000 rpm; 20 sec) so that the dry film thickness was 5 μm.

Next, the glass substrate was heated to 70° C. by a heater plate, and in this state, selenium was deposited thereon for about 15 minutes under a low vacuum (6 torr), thereby providing an a-selenium particle layer having an average particle diameter of 0.5 μm near the surface of the thermoplastic resin layer, and thus obtaining an electrostatic information recording medium.

The surface of this electrostatic information recording medium was charged in the dark by corona charging so that the surface potential was +200 V for one sample and −200 V for another, and then light was applied thereto to form surface potentials of +180 V and −180 V as internal electric charge. Thereafter, the electric charge retaining performance thereof was measured.

When the surface potential was measured after the medium had been allowed to stand for 10 days under ordinary temperature and humidity conditions, the surface potentials of the two samples were +30 V and −50 V, respectively.

COMPARATIVE EXAMPLE 3

On ITO stacked on a glass substrate having a thickness of 1 mm, a 30% solution of a thermoplastic polystyrene resin (Piccolastic D125, trade name, manufactured by Rika Hercules Co.; softening point: 125° C.) in xylene was coated by spin coating method (1000 rpm; 20 sec) so that the dry film thickness was 5 μm. Next, the glass substrate was heated to 110° C. by a heater plate, and in this state, selenium was deposited thereon for about 15 minutes under a low vacuum (6 torr), thereby providing an a-selenium particle layer having an average particle diameter of 0.5 μm near the surface of the thermoplastic resin layer, and thus obtaining an electrostatic information recording medium.

The surface of this electrostatic information recording medium was charged in the dark by corona charging so that the surface potential was +200 V for one sample and −200 V for another, and then light was applied thereto to form surface potentials of +180 V and −180 V as internal electric charge. Thereafter, the electric charge retaining performance thereof was measured.

When the surface potential was measured after the medium had been allowed to stand for 10 days under ordinary temperature and humidity conditions, the surface potentials of the two samples were +30 V and −65 V, respectively. When the medium was allowed to stand for 10 days under the high-temperature conditions of 60° C. and 20% RH as an accelerated test, the surface potentials of the two samples became +10 V and −15 V, respectively.

COMPARATIVE EXAMPLE 4

An electrostatic information recording medium was prepared in the same way as in Example 18 except that no fluorocarbon resin was provided on the deposition layer, and the electric charge retaining performance of this medium was measured in the same way as in Example 18.

When the medium was allowed to stand for 30 days under the high-temperature conditions of 60° C. and 20% RH, the surface potentials of the two samples became +40 V and −75 V, respectively. When the medium wad allowed to stand for 30 days under the high-humidity conditions of 40° C. and 95% RH, the surface potentials of the two samples became +30 V and −70 V, respectively.

INDUSTRIAL APPLICABILITY

The electrostatic information recording medium of the present invention has improved negative electric charge retaining performance and is particularly superior in the positive electric charge retaining performance. Accordingly, it is possible to record information independently of the kind of photosensitive member used. In addition, the information electric charge stored therein is extremely stable. Further, since the information storage means is arranged in units of electrostatic charge, the electrostatic information recording medium can store information of high quality and high resolution. It is therefore possible to output an electric signal corresponding to the stored information electric charge and to display it on a CRT or to print it out by a sublimation transfer printer or the like. In addition, the electrostatic information recording medium of the present invention can be used, for example, as a recording drum for an ion flow printer. In such a case, it is possible to construct a so-called multi-printer which enables a desired number of hard copies to be obtained.

What is claimed is:

1. An electrostatic information recording medium having an electric charge retaining layer stacked on at least an electrode layer, wherein said electric charge retaining layer comprises an insulating fluorocarbon resin in solid state having resistivity of $10^{14}$ ohm-cm or more, and an insulating organic substance having no photoconductivity that is insoluble in a fluorine-containing solvent, wherein said insulating organic substance is dispersed and fixed in said insulating fluorocarbon resin.

2. An electrostatic information recording medium having an electric charge retaining layer stacked on at least an electrode layer, wherein said electric charge retaining layer comprises an insulating polystyrene resin in solid state, having resistivity of $10^{14}$ ohm-cm or more and an insulating organic substance having no photoconductivity, wherein said insulating organic substance is dispersed and fixed in said insulating polystyrene resin.

3. An electrostatic information recording medium according to claim 1 or 2 wherein a spectrum of thermally stimulated currents, which is obtained by measuring said electric charge retaining layer with an open-circuit thermally stimulated current measuring device after said electric charge retaining layer has been positively charged, has a hetero-peak in addition to a homo-peak.

* * * * *